(12) United States Patent         (10) Patent No.:    US 7,725,081 B2
Koga et al.                       (45) Date of Patent:    May 25, 2010

(54) COMMUNICATION APPARATUS

(75) Inventors: Hisao Koga, Chikushi-gun (JP);
Nobutaka Kodama, Fukuoka (JP);
Taisuke Konishi, Fukuoka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 11/871,820

(22) Filed: Oct. 12, 2007

(65) Prior Publication Data
US 2008/0095253 A1    Apr. 24, 2008

Related U.S. Application Data

(62) Division of application No. 10/913,495, filed on Aug. 9, 2004, now Pat. No. 7,302,240.

(30) Foreign Application Priority Data
Aug. 7, 2003  (JP) ............... 2003-288747

(51) Int. Cl.
H04B 17/00    (2006.01)
H04B 1/10     (2006.01)
(52) U.S. Cl. .............. 455/67.11; 455/67.13; 455/226.1; 455/296; 375/240.27; 375/325; 375/346
(58) Field of Classification Search .............. 455/67.11, 455/166.1, 283–284, 296, 67.13, 226.1–226.4, 455/402; 375/240.27, 321, 325, 346–350
See application file for complete search history.

(56) References Cited

U.S. PATENT DOCUMENTS

| 5,497,398 | A  | 3/1996  | Tzannes et al. |
| 5,631,610 | A  | 5/1997  | Sandberg et al. |
| 5,636,246 | A  | 6/1997  | Tzannes et al. |
| 5,995,539 | A  | 11/1999 | Miller |
| 6,397,368 | B1 | 5/2002  | Yonge, III et al. |
| 6,442,129 | B1 | 8/2002  | Yonge, III et al. |
| 6,507,622 | B2 | 1/2003  | Maki et al. |
| 6,532,256 | B2 | 3/2003  | Miller |
| 6,574,282 | B1 | 6/2003  | Okado |

(Continued)

FOREIGN PATENT DOCUMENTS

JP    62294339    12/1987

(Continued)

OTHER PUBLICATIONS

H. S. Malvar; "Signal Processing with Lapped Transforms," Artech House, Inc., pp. 204-209 and 214-219, 1992.

(Continued)

*Primary Examiner*—Simon D Nguyen
(74) *Attorney, Agent, or Firm*—Dickinson Wright PLLC

(57) ABSTRACT

A communication apparatus has an A/D converter which converts an analog signal which was received, into a digital signal, a converter which converts a reception signal so as to enable handling of phase information, a carrier detector which detects presence or absence of the reception signal, a synchronous circuit which extract synchronization timing from the reception signal, an equalizer which corrects the reception signal so as to cancel influence of a transmission path, a transmission path estimator which estimates a state of a power line transmission path, and a judging unit which judges the reception signal, which was amended by the equalizer, by use of a threshold value.

16 Claims, 26 Drawing Sheets

U.S. PATENT DOCUMENTS

| | | |
|---|---|---|
| 6,754,170 B1 | 6/2004 | Ward |
| 6,952,441 B2 | 10/2005 | Peeters |
| 7,058,002 B1 | 6/2006 | Kumagai et al. |
| 7,161,896 B1 | 1/2007 | Hart et al. |
| 2001/0033612 A1 | 10/2001 | Peeters |
| 2002/0041637 A1* | 4/2002 | Smart et al. ............... 375/316 |
| 2002/0126768 A1* | 9/2002 | Isaksson et al. ............ 375/298 |
| 2002/0137467 A1 | 9/2002 | Tzannes |
| 2003/0016773 A1 | 1/2003 | Atungsiri et al. |
| 2003/0043732 A1 | 3/2003 | Ketchum et al. |
| 2003/0133473 A1 | 7/2003 | Manis et al. |
| 2003/0185147 A1* | 10/2003 | Taga et al. ................ 370/210 |
| 2003/0210749 A1 | 11/2003 | Asjadi |
| 2004/0005022 A1 | 1/2004 | Zhu et al. |
| 2004/0105512 A1 | 6/2004 | Priotti |
| 2004/0160990 A1 | 8/2004 | Logvinov et al. |
| 2004/0190648 A1 | 9/2004 | Anim-Appiah et al. |
| 2006/0258316 A1* | 11/2006 | Lei et al. ................... 455/296 |

FOREIGN PATENT DOCUMENTS

| | | |
|---|---|---|
| JP | 11-168515 | 6/1999 |
| JP | 11163807 | 6/1999 |
| JP | 2720131 | 7/1999 |
| JP | 2920131 | 8/1999 |
| JP | 11252031 | 9/1999 |
| JP | 11275165 | 10/1999 |
| JP | 11-313043 | 11/1999 |
| JP | 2001-298439 | 10/2001 |
| WO | 98/10555 | 3/1998 |
| WO | 9810545 | 3/1998 |

OTHER PUBLICATIONS

International Search Report dated Nov. 30, 2004.
Japanese Office Action dated Nov. 22, 2006 with English translation.
M. C. Sun, et al. "Power-Line Communications using DWMT Modulation " International Symposium on Circuits and Systems, IEEE, XP002271367, vol. 4, pp. 493-496, May 26-29, 2002.
Japanese Office Action dated Jan. 29, 2009.

* cited by examiner

*FIG. 23*

| PREAMBLE SYMBOL | INFORMATION SYMBOL |

*FIG. 26*

|PRE|PRE|PRE|PRE|PRE|PRE|SYNC|TMI|FC1|FC2|FC3|FC4|PL1|PL2|PL3|PL4|

COMMUNICATION APPARATUS

This is a divisional application of application Ser. No. 10/913,495 filed Aug. 9, 2004 (pending), which is based upon and claims the benefit of priority of Japanese Patent Application No. 2003-288747 filed Jul. 30, 2004, the contents of which are incorporated herein by reference in its entirety.

BACKGROUND OF THE INVENTION

This invention relates to a communication apparatus and a communication method using multi-carrier transmission system, particularly, to a communication apparatus and a communication method which used a multi-carrier transmission system (Digital Wavelet Multi Carrier transmission system, hereinafter, referred to as DWMC transmission system) which carries out data transmission by digital modulation and demodulation processing which used a real coefficient wavelet filter bank which is more suitable for a power line transmission channel and a transmission channel such as a telephone line.

As a conventional technology which has been frequently used in the multi-carrier transmission system, there are FFT (Fast Fourier Transform) based OFDM (Orthogonal Frequency Division Multiplexing) and Wavelet based OFDM. Such an example that these technologies were applied to power line communication is disclosed in (JP-A-11-163807). The wavelet base has a resistance property to inter-carrier interference since a side Lobe of an amplitude spectrum is low, and is of an excellent characteristic. In addition, in order to avoid collapse of orthogonality, in the FFT based OFDM, GI (guard interval) is indispensable, while in the wavelet based OFDM, it is not necessary. This improves transmission efficiency. Since processing of the FFT based OFDM is known well, an explanation will be omitted. Since the wavelet based OFDM is digital modulation and demodulation processing which used a real coefficient wavelet filter bank, it is a multi-carrier system of a kind, and is a thing which generates a transmission signal by combining a plurality of digital modulation waves by the real coefficient filter bank. As a modulation system of each carrier, PAM (Pulse Amplitude Modulation) is used. Data transmission by a DWMC transmission system is transmitted in such a manner that an impulse response of each sub carrier is overlapped in each sub carrier as shown in FIG. 20. Each transmission symbol becomes such a time wave that an impulse response of each sub carrier was combined as shown in FIG. 21. An example of the amplitude spectrum is shown in FIG. 22. In the DWMC transmission system, approximately several hundred transmission symbols of FIG. 20 are collected to configure one transmission frame. A configuration example of a DWMC transmission frame is shown in FIG. 23. In this DWMC transmission frame, in addition to an information data transmission symbol, a preamble symbol etc., which are used for carrier detection, synchronization, equalization and so on, are included. A conceptual configuration of a power line communication apparatus in case that the DWMC transmission system was adopted is shown in FIG. 19. Firstly, in a transmitting device 299, bit data is converted into symbol data by a symbol mapper 210, and in accordance with each symbol data, symbol mapping (PAM) is carried out. And, in a serial-parallel converter 220, a real value di (i=1~M) is given with respect to each sub carrier, and in an inverse wavelet transformation part 230, inverse wavelet transformation is carried out on a time axis. By this, a sample value of a time axis waveform is generated, and a sample value sequence, which represents a transmission symbol, is generated. In a D/A converter 240, it is converted from this sample value sequence to a base band analog signal waveform, which is continued in terms of time, and transmitted. In a receiving device 399, a reception signal is converted into a digital signal in an A/D converter 310, and wavelet-transformed so as to be able to handle phase information in a complex wavelet transformer 320, and in a carrier detector 330, presence or absence of the reception signal is detected, and in a synchronous circuit 340, synchronizing timing is extracted from the reception signal, and in an equalizer 350, the reception signal is compensated so as to cancel influence of a transmission channel, and in a channel estimation unit 370, a state of a power line transmission channel is estimated, and in a decision unit 380, the reception signal is decided by use of a threshold level. Here, the number of pieces of the sample values on a time axis, which are generated by inverse wavelet transform, is normally $2^n$ (n is a positive integer) pieces.

In the meantime, in a conventional system, there was such a problem that transmission channel estimation, which is carried out in a receiving device, can not follow sufficiently to instantaneous fluctuation and periodical fluctuation of wideband noise or narrow-band noise, or instantaneous fluctuation and periodical fluctuation which come up with amplitude fluctuation and phase fluctuation of a transmission channel itself, when transmission channel estimation is simply carried out only once in a certain cycle, in a power line transmission channel. Here, as one example of the power line transmission channel, an attenuation characteristic of the power lien transmission channel is shown in FIG. 24. In addition, FIG. 25 is a view which shows a group delay characteristic of the power line transmission channel.

As described above, in a multi-carrier power line communication apparatus which used the conventional wavelet, it has such a problem that transmission channel estimation, which is carried out in a receiving device, cannot follow sufficiently to instantaneous fluctuation and periodical fluctuation of wide-band noise or narrow-band noise, or instantaneous fluctuation and periodical fluctuation which come up with amplitude fluctuation and phase fluctuation of a transmission channel itself, when transmission channel estimation is simply carried out only once in a certain cycle, in a power line transmission channel. In this power line communication apparatus, it is requested to sufficiently take hold of a transmission channel state, and to heighten transmission efficiency.

SUMMARY OF THE INVENTION

This invention is to provide a communication apparatus which solves the above-described problem, and which sufficiently takes hold of a power line transmission channel characteristic, and which follows to various transmission channel fluctuation, and which can heighten transmission efficiency.

This invention is a communication apparatus which carries out multi-carrier modulation processing, and a receiving device is equipped with an A/D converter which converts an analog signal which was received, into a digital signal, a transformer which generates an in-phase signal and a orthogonal signal by converting a reception signal, a carrier detector for detecting the reception signal, a synchronous circuit for being synchronized with the reception signal, an equalizer for compensating a distorted signal due to influence of a transmission channel, a noise detector which detects presence or absence of narrow-band noise in each sub carrier band by use of a signal which was transformed by the transformer, a channel estimation unit which determines a multi-value level or modulation scheme of primary modulation which is used by each sub carrier of a symbol mapper in a transmitting device, by use of a signal which is outputted from the equalizer and information of presence or absence of the narrow-band noise which is outputted from the noise detector, and a decision unit which carries out a decision by use of the signal which is outputted from the equalizer.

By this, it becomes possible to sufficiently follow to various fluctuations of a transmission line such as a power line transmission channel, and as a result, it becomes possible to heighten transmission efficiency.

BRIEF DESCRIPTION OF THE DRAWINGS

FIG. 23 is a view which shows a configuration example of an inside of a transmission frame in the DWMC transmission system.

FIG. 26 is a view which shows a frame configuration example of a communication apparatus in an embodiment 22 of this invention.

DETAILED DESCRIPTION OF THE PREFERRED EMBODIMENTS

Hereinafter, embodiments of this invention will be described with reference to FIG. 1 to FIG. 18.

Figure 1:
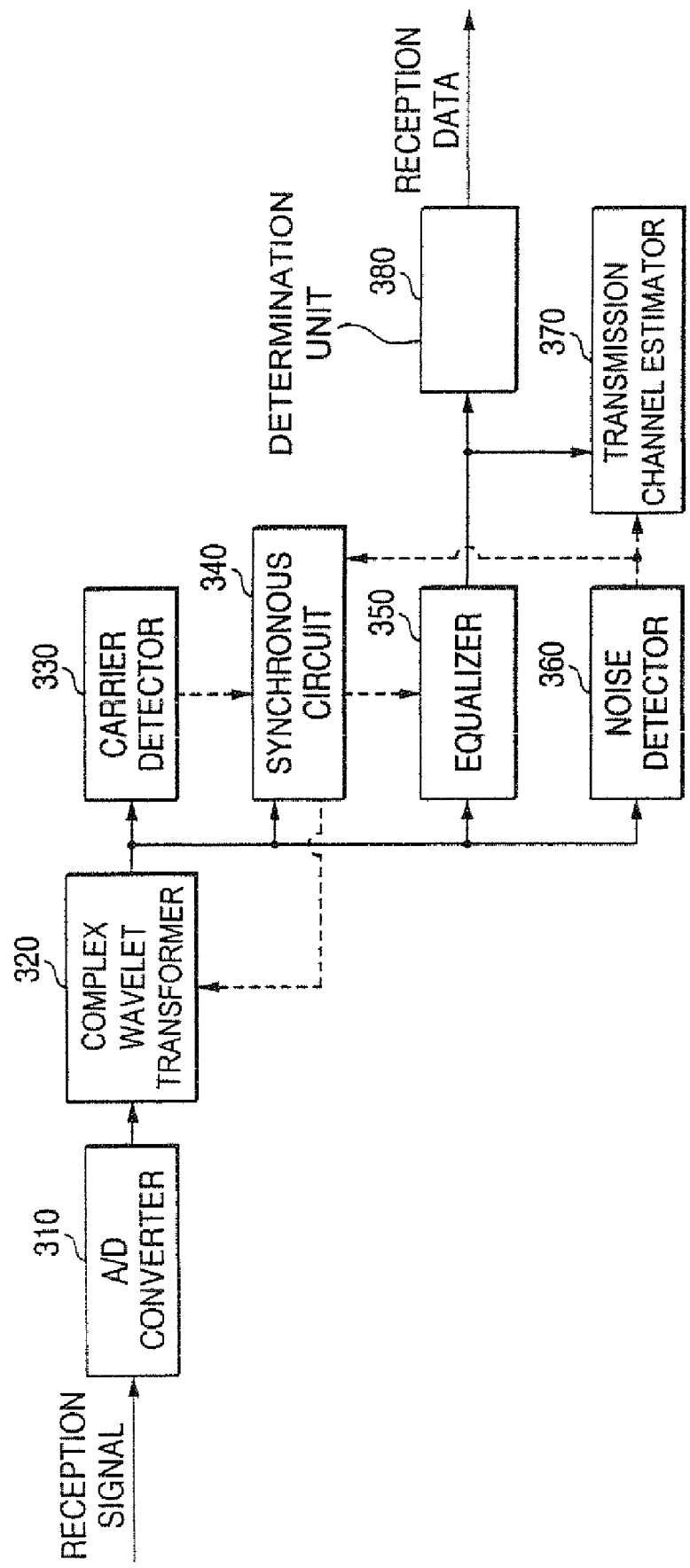
FIG. 1 is a block diagram which shows a receiving device in an embodiment 1 of this invention.

FIG. 1 is a block diagram which shows a receiving device in an embodiment 1 of this invention. In passing, a transmitting device is the same as the transmitting device 299 of FIG. 19, as to which an explanation was carried out in the conventional technology.

In FIG. 1, 310 designates an A/D converter which converts an analog signal into a digital signal, and 320 designates a complex wavelet transformer which generates a in-phase signal and an orthogonal signal by wavelet-converting a reception signal, and 330 designates a carrier detector for detecting a transmission signal which is transmitted from a transmitting device, and 340 designates a synchronous circuit for synchronizing with the reception signal, and 350 designates an equalizer for compensating a signal which was distorted by influence of a transmission channel, and 360 designates a noise detector which detects presence or absence of narrow-band noise in each sub carrier band, by use of a signal after complex wavelet transform, and 370 designates a channel estimation unit which determines primary modulation which is used in each sub carrier of a symbol mapper in a transmitting device, by use of a signal which is outputted from the equalizer 350 and information of presence or absence of narrow-band noise which is outputted from the noise detector, and 380 designates a decision unit which carries out a decision by use of a signal which is outputted from the equalizer 350.

As to the receiving device which was configured in this manner, its operation will be described by use of FIG. 1 to FIG. 3.

Figure 2:
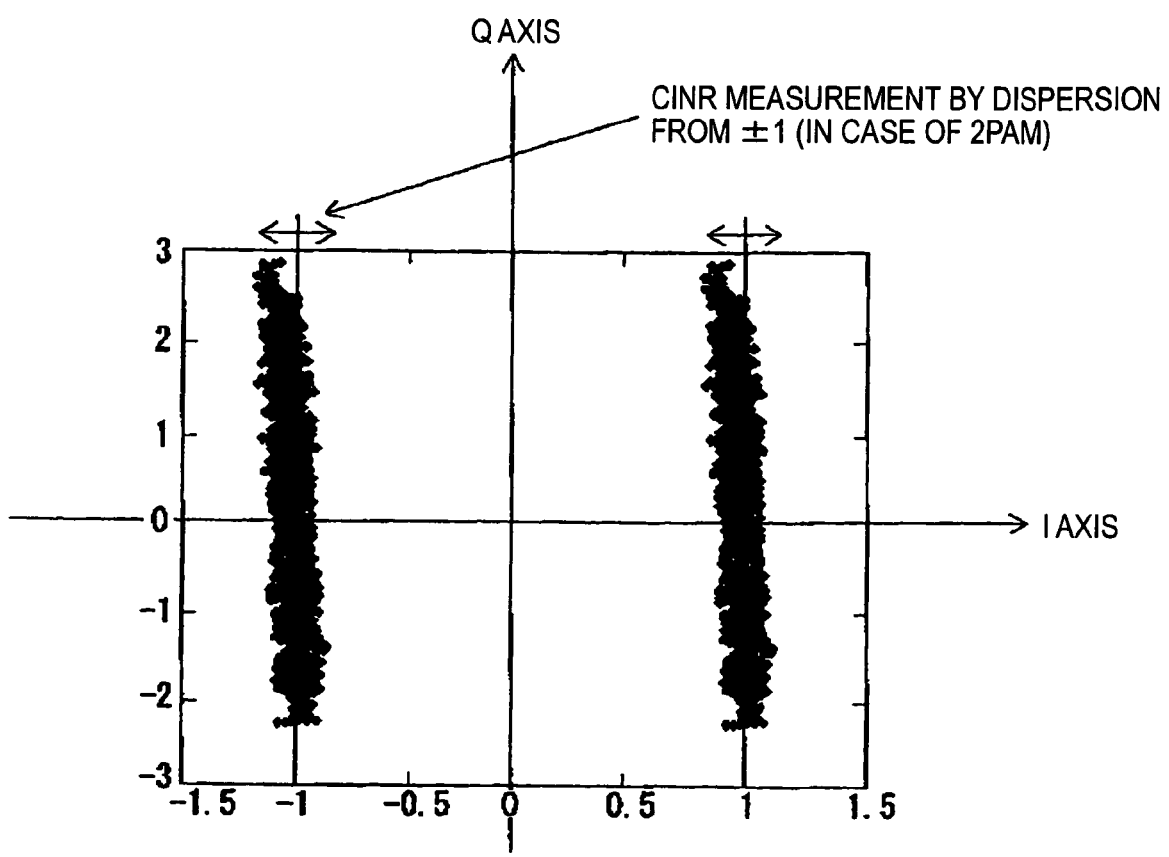
FIG. 2 is a view which shows a scatter of an equalizer output signal.
Figure 3:
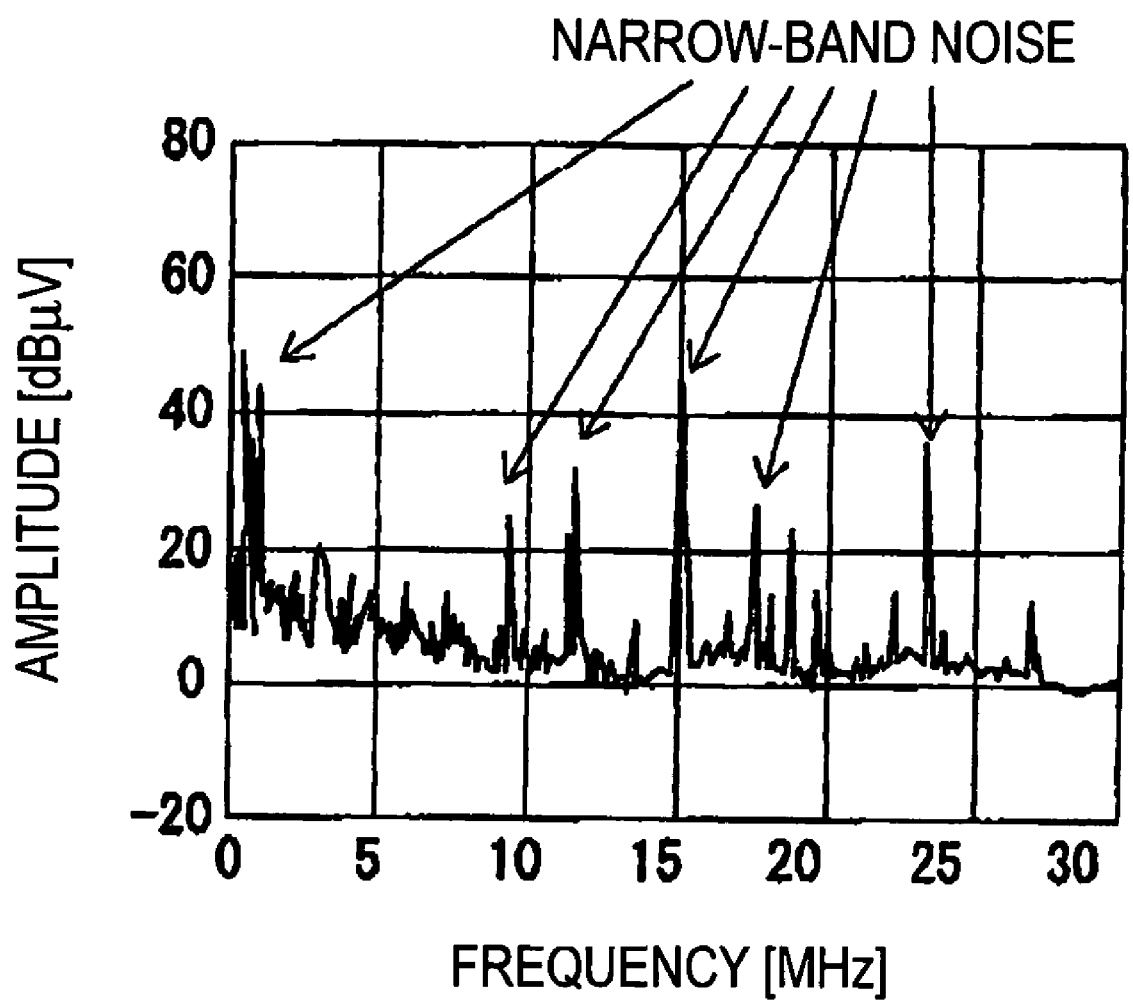
FIG. 3 is a view which shows a noise characteristic in a power line transmission channel.

FIG. 2 is a view which shows a scatter of an equalizer output signal, and FIG. 3 is a view which shows a noise characteristic in a power line transmission channel.

In FIG. 1, a reception signal is converted from an analog signal into a digital signal in the A/D converter 310, and in the complex wavelet transformer 320, a digital signal, which was received, is wavelet-transformed, and in the carrier detector 330, a signal, which is transmitted from the transmitting device, is detected, and in the synchronous circuit 340, wavelet transform timing is adjusted of the complex wavelet transformer 320, so as to be synchronized with a reception signal by use of a preamble signal, and in the equalizer 350, influence of a transmission channel is removed, and in the noise detector 360, narrow-band noise, which exists in a use band, is detected, and in the channel estimation unit 370, a state of a transmission channel is estimated, and a primary modulation system of a symbol mapper which is used in the transmitting device is determined, and in the decision unit 380, a decision is carried out by use of a signal which is outputted from the equalizer 350.

FIG. 2 shows a scatter (all sub carrier portions) of an equalizer output of the receiving device in case that all sub carriers 2PAM were selected in the symbol mapper of the transmitting device. Generally, in case of carrying out transmission channel estimation, a well-known frame is made to be transmitted from the transmitting device for the purpose of transmission channel estimation, and in the channel estimation unit 370 of the receiving device, CINR (Carrier power to (Interference-plus-Noise) power Ratio) is measured with dispersion from signal point allocation (in case of 2PAM, .+−.1) as a noise amount in accordance with the output from the equalizer 350. By use of CINR which was measured in each sub carrier, primary modulation (e.g., 16PAM, 8PAM etc.), which is used in each sub carrier, is selected, and informed to the transmitting device 299. This is transmission channel estimation which is normally carried out in the transmission and receiving device.

Here, such a case that a communication system of this invention was applied to power line communication will be described. In the power line communication, as a band which can be used, 2 MHz to 30 MHz is being considered. FIG. 3 shows a noise characteristic in a band which is used for the power line communication. Since this band is used for amateur radio and short wave broadcasting etc., in addition to the power line communication, those existing systems exist as narrow-band noise to the power line communication, as shown in FIG. 3. In case that these narrow-band noises exist on a steady basis, since CINR is deteriorated in a certain sub carrier at the time of transmission channel estimation, it is possible to deal with, by making a sub carrier, which is using the same band as that band, non-use. In addition, if these narrow-band noise levels exist at a noise level or less, which was obtained at the time of transmission channel estimation, on a steady basis, even if narrow-band noise does not exist, CINR is not deteriorated, and therefore, it does not become a problem.

However, when there is such a case that these narrow-band noises appears and disappears on an irregular basis and become larger than a noise level at the time of transmission channel estimation, it becomes unstable in such a manner that there is an error or there is not an error until the time of transmission channel estimation which will be carried out next, and even in case that error correction was carried out, in the worst case, there becomes such a state that a frame retransmission request has to be carried out, which results in dropping down transmission efficiency.

For the purpose of avoiding the suchlike thing, as shown in FIG. 1, noise detection is carried out by the noise detector 360. In addition to the output of the equalizer 350, this detection result is also used as information for estimation by the channel estimation unit 370. The way to detect noise detection is concretely explained. In the complex wavelet transformer 320, wavelet transformation is carried out, and when an output in each sub carrier is measured, as shown in FIG. 3, signals including narrow band noise are outputted from the complex wavelet transformer 320.

Here, the noise detector 360 obtains an average value, median or the like of all sub carriers, checks a sub carrier, which has a large value of for example, 12 dB or more, detects such sub carrier as "having narrow band noise" and transfers this information to the channel estimation unit 370. In case that the system becomes unstable, the channel estimation unit inhibits to use of the sub carrier which was checked here.

In addition, by use of an output of the complex wavelet transformer 320, the carrier detector 330, the synchronous circuit 340, and the equalizer 350 are controlled, and in these blocks, an average value etc. are obtained through the use of values of all sub carriers, and thereby, processing is carried out. In this case, when narrow-band noise of a high level is inputted and processed in those circuits, it is conceivable that a characteristic is deteriorated to a large extent. On that account, it is possible to maintain high performance by making a sub carrier, which was checked in the noise detector 360, non-use in these circuits.

By these configurations, in case that this system was applied to the power line communication, it is possible to mitigate influence of narrow-band noise which is received from another system, and good transmission channel estimation becomes possible, and in addition, it is possible to also improve carrier detection and synchronization accuracy.

As mentioned above, the communication apparatus of the present invention is explained as the power line communication. The power line communication is one example of the transmission line which causes irregularly the narrow band noises. Thus, the present invention is not limited to the power line communication.

In passing, in the embodiment 1, the complex wavelet transformer 320 is used, but a communication apparatus of this invention is not restricted to this, and it is possible to apply to such a wavelet transformer that a phase of each sub carrier can be confirmed.

In case that there occurs no phase lag in each sub carrier, it is possible to apply, such a wavelet transformer by which an in-phase signal is obtained, to a communication apparatus of this invention.

Embodiment 2

Figure 4:
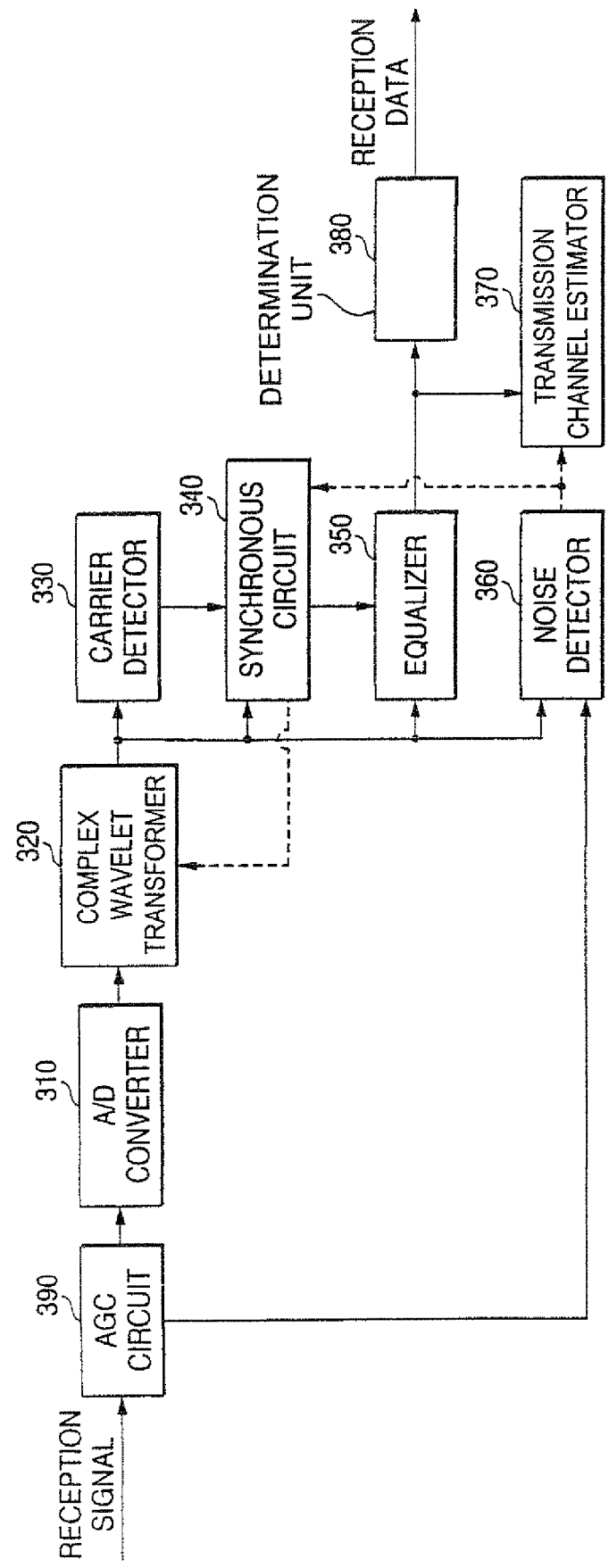
FIG. 4 is a block diagram which shows a receiving device in an embodiment 2 of this invention.

FIG. 4 is a block diagram which shows a receiving device in an embodiment 2 of this invention. In passing, a transmitting device is the same as the transmitting device 299 of FIG. 19.

Figure 5:
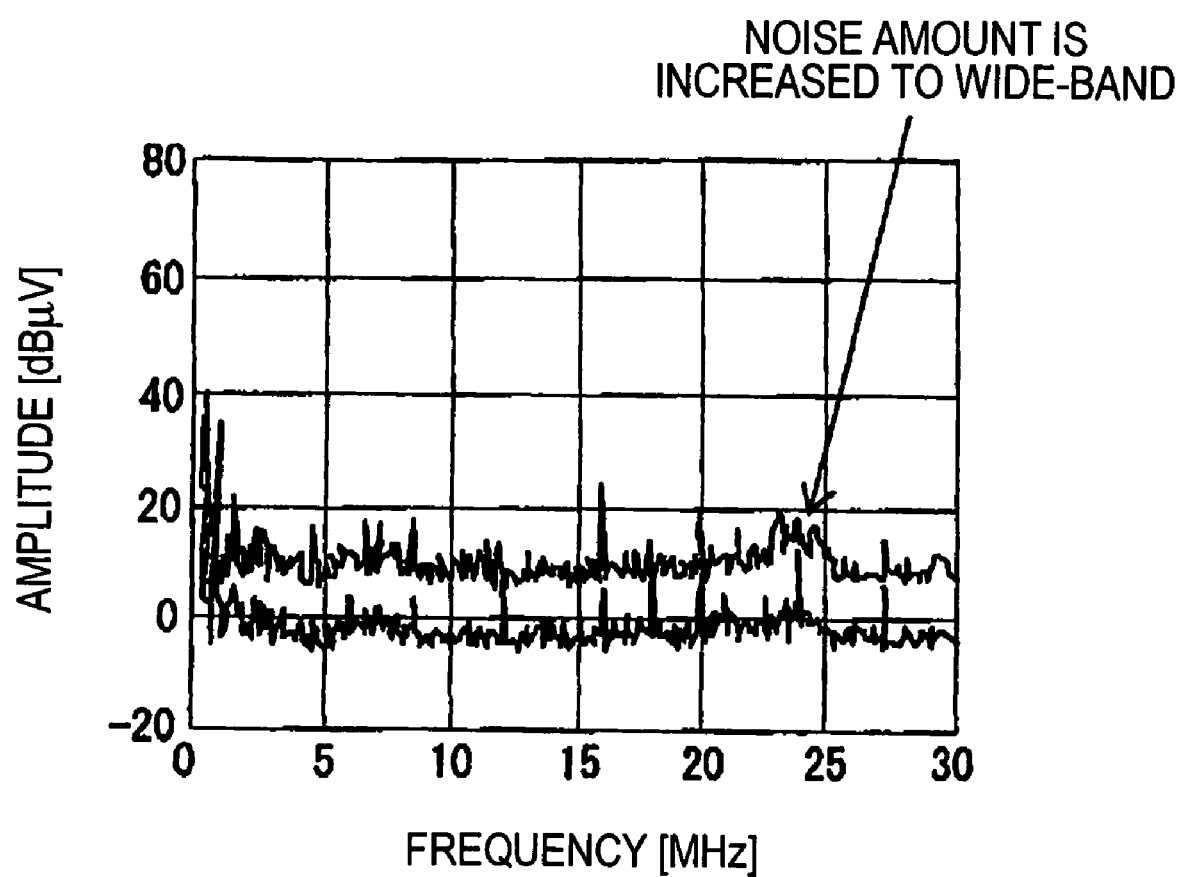
FIG. 5 is a view which shows a noise characteristic in such a case that wide-band noise was added in a power line transmission channel.

In addition, a difference between the receiving devices of FIG. 4 and of FIG. 1 is only an AGC (Automatic Gain Control) circuit 390. Since other circuits are the same as the circuits which were explained in FIG. 1, descriptions are pursuant to the descriptions in the embodiment 1. 390 designates an AGC circuit which automatically adjust a gain of a reception signal. Next, by use of FIG. 4 and FIG. 5, an operation in case that this system was applied to the power line communication will be described. FIG. 5 is a view which shows a noise characteristic in case that wide-band noise was added in a power line transmission channel.

A difference from the embodiment 1 is to carry out noise detection by the noise detector 360 including a gain which is used by the AGC circuit.

In the embodiment 1, presence or absence of narrow-band noise can be detected, and in addition to this detection, by detecting a gain of the AGC circuit, it becomes possible to know influence of wide-band noise, which could not be known in this embodiment 1. FIG. 5 shows an amplitude spectrum of a power line transmission channel by presence or absence of an electric equipment which continuously generates impulse noise of a high level in a time axis.

Concretely speaking, by turning ON an electric equipment which generates impulse noise of a high level in a time axis, a noise level is increased in all bands (from 2 MHz to 30 MHz), which seem to be used in power line communication.

In the suchlike case, since it is not possible to decide presence or absence of wide-band noise in the embodiment 1, presence or absence of wide-band noise is decided by use of a gain of the AGC circuit 390, in the receiving device in this embodiment 2.

By this system, it is possible to detect narrow-band noise and wide-band noise, and in case that it was detected, by carrying out transmission channel estimation in tune with the number of retransmission etc., it becomes possible to carry out good communication in a very bad power line communication transmission channel.

For example, even in case that there is no narrow-band noise, which makes a sub carrier, in which narrow-band noise exists on an irregular basis, non-use, the noise detector 360, considering that a system has becomes unstable due to random wide-band noise when wide-band noise exists by an output from the AGC circuit 390 and retransmission occurs frequently in normal transmission channel estimation, mitigates a threshold value which is used for transmission channel estimation and transmission channel estimation is carried out at a plurality of times, and, in that state, determines primary modulation of each sub carrier by using a minimum CINR value in each sub carrier. By doing in this manner, even under a power line communication transmission channel in which various noises exist, it becomes possible to carry out good communication.

In case that this system was applied to power line communication, by a communication apparatus which is described in the embodiment 2 of this invention, it is possible to reduce influence of narrow-band noise which is received from another system, and mitigated is influence of wide-band noise due to impulse noise of a high level at a time axis, which is emitted from an electric equipment etc., and good transmission channel estimation becomes possible.

Embodiment 3

A channel estimation unit in an embodiment 3 of this invention will be described. In this embodiment, a receiving device, and a transmitting device of a communication apparatus are the same as in the embodiment 1 or 2.

Figure 7:
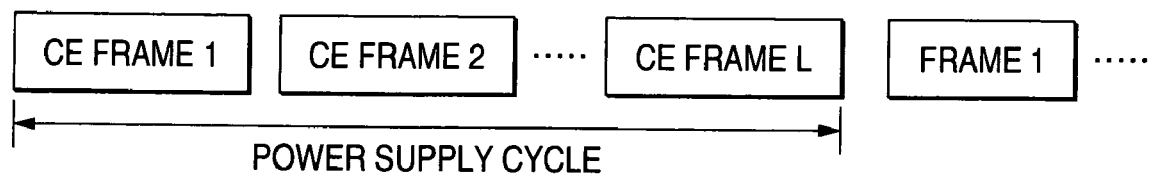
FIG. 7 is a frame configuration view in such a case that transmission channel estimation is carried out by use of time of a power supply cycle.

FIG. 7 shows a frame configuration view in case of carrying out transmission channel estimation by use of time of a power supply cycle.

Figure 6:
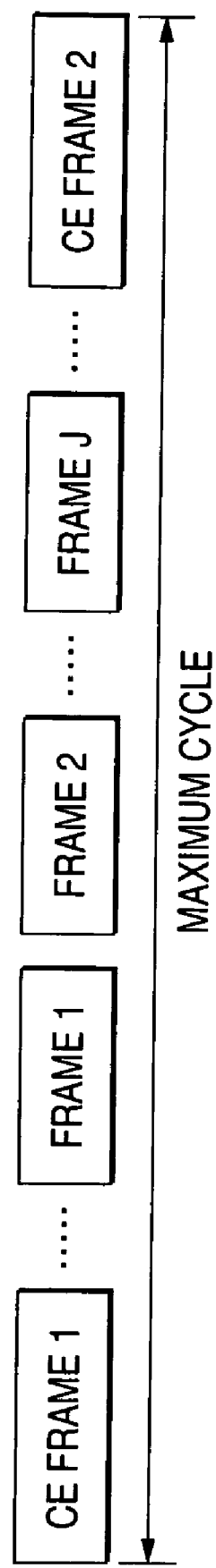
FIG. 6 is a frame configuration view for explaining an operation of a normal channel estimation unit.

Next, an operation will be described. FIG. 6 shows a frame configuration view for explaining an operation of a normal channel estimation unit.

Normally, as shown in FIG. 6, a transmission channel estimation frame is added in a frame to be transmitted and received (in the figure, a "CE frame" is the "transmission channel estimation frame").

Generally speaking, in a transmission channel estimating method of the suchlike configuration, this transmission channel estimation frame is used again on an irregular basis, when a transmission channel fluctuates significantly, and if a past transmission channel estimation result is used, many errors will be generated, and as a result, it comes to be in such a state that retransmission occurs frequently.

Or, since efficiency is bad if transmission channel estimation is carried out after retransmission occurs frequently, there is also such a case that certain maximum time has been determined, and transmission channel estimation is carried out in tune with its cycle.

In FIG. 6, to instantaneous fluctuation of a transmission channel, it is possible to cope with it by carrying out re-transmission channel estimation, since decision errors arise in case that it is different from a past transmission channel estimation result significantly, and it results in retransmission occurring frequently, but, for example, in case that instantaneous fluctuation of a transmission channel arises in synchronization with a power supply cycle (in case of 50 Hz, 20 ms) or its half cycle (in case of 50 Hz, 10 ms), if re-transmission channel estimation is carried out on each occasion, transmission efficiency will be deteriorated significantly.

In order to avoid the suchlike deterioration, as shown in FIG. 7, the channel estimation unit 370 in the embodiment 3 of this invention carries out an operation of transmission channel estimation for a power supply cycle 1 cycle portion, for example, by use of a transmission channel estimation frame continuously (that is, sequentially) during a period of a power supply cycle.

As a result of that, it is possible to improve entire transmission efficiency by carrying out such things that, taking hold of which timing fluctuation due to noise and transmission channel fluctuation were generated at, in that zone, it is made to not send out a signal, or it is made to lower a modulation scheme level of primary modulation, or frequency and time diversity is carried out to make that frame hold a resistance property.

In addition, to fluctuation which arises at a different cycle, there is a necessity to carry out transmission channel estimation in tune with the cycle. Further, it is also possible to carry out transmission channel estimation randomly, but not continuously, (that is, not sequentially), by making such a state that total transmission channel estimation time becomes nearly 1 cycle portion.

By the suchlike configuration, for example, to fluctuation of noise and transmission channel fluctuation which were synchronized with a power supply cycle, it becomes possible to make a prediction, and it becomes possible to receive and to transmit a signal effectively.

Embodiment 4

The channel estimation unit 370, which is used in a communication apparatus in an embodiment 4 of this invention, will be described.

In this embodiment, by use of the configuration/operation of the communication apparatus of the embodiment 3, transmission channel estimation is carried out in a certain cycle.

Further additionally, the channel estimation unit 370 in this embodiment, in case that, at that time, fluctuation of noise and fluctuation of a transmission channel exist in 1 cycle, but in each sub carrier, influence of transmission channel fluctuation is smaller than a threshold value (in case that it does not have influence on errors), becomes to maintain good transmission efficiency by use of that sub carrier even if there is fluctuation.

By realizing the suchlike configuration, as compared to the communication apparatus in the embodiment 3, it becomes possible to further heighten transmission efficiency.

Embodiment 5

A channel estimation unit in an embodiment 5 of this invention will be described.

Figure 8:
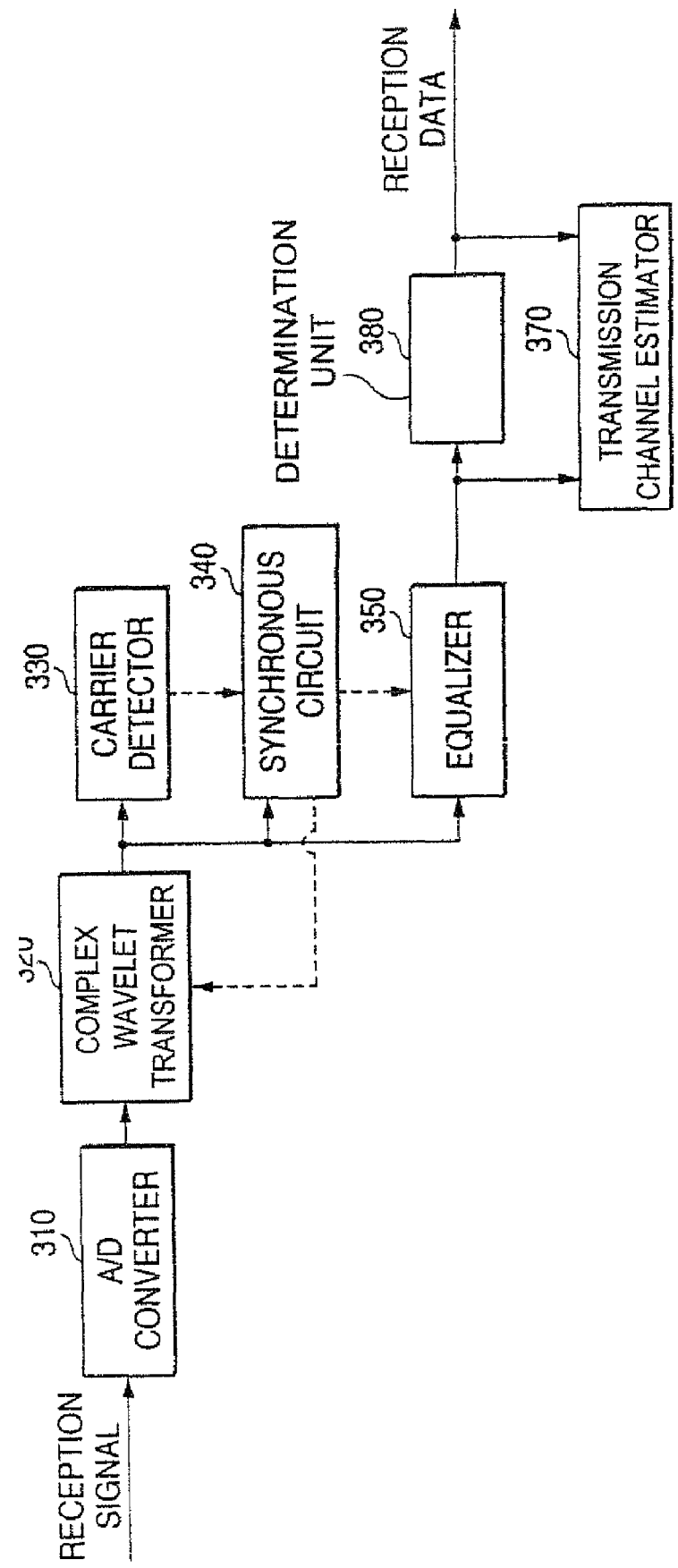
FIG. 8 is a block diagram of a receiving device in an embodiment 5 of this invention.

A block diagram of a receiving device in the embodiment 5 of this invention is shown in FIG. 8.

Figure 19:
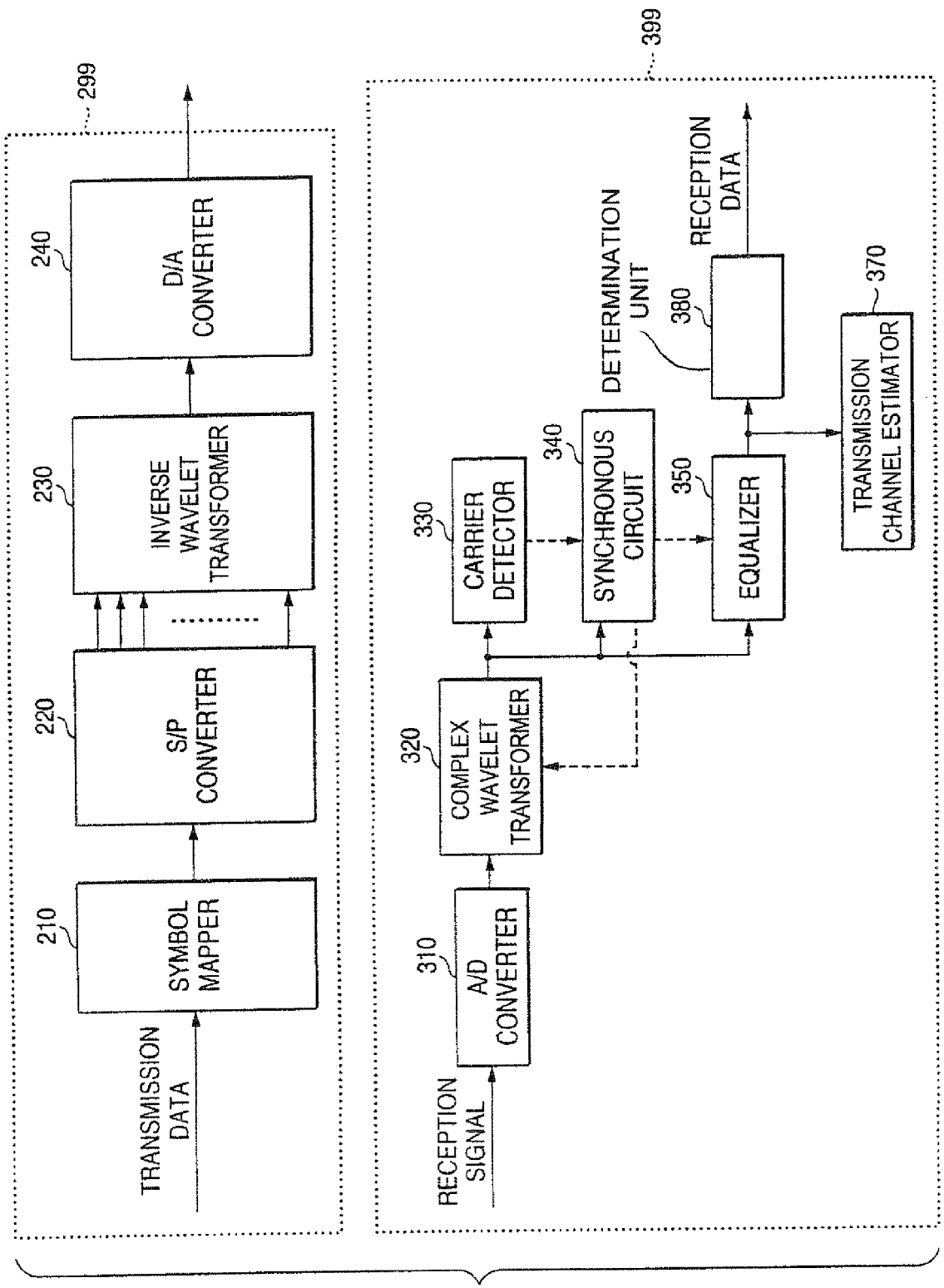
FIG. 19 is a view which shows a power line communication apparatus in a conventional system.
Figure 20:
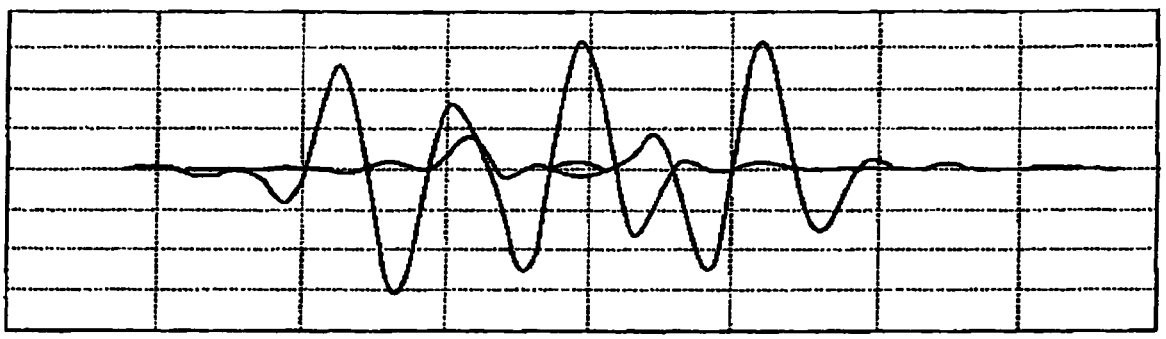
FIG. 20 is a view which shows a wavelet waveform example.
Figure 21:
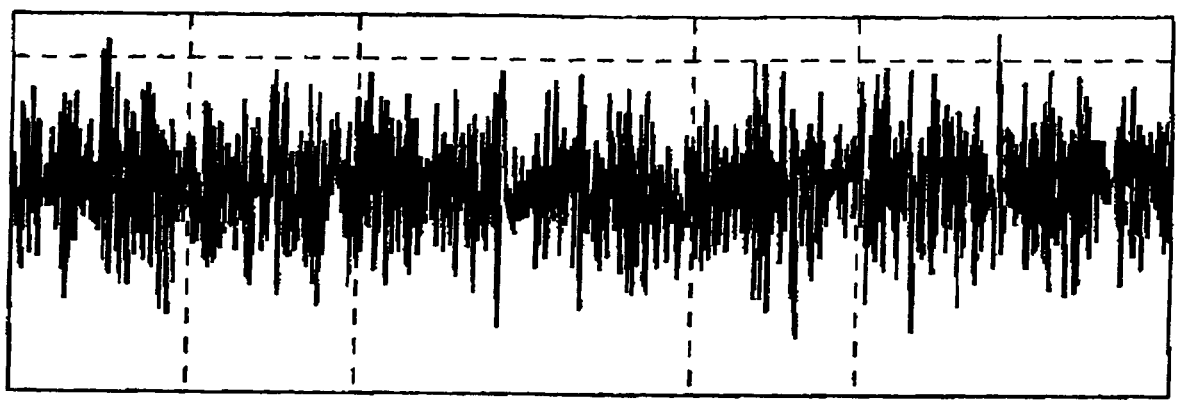
FIG. 21 is a view which shows a transmission waveform example in the DWMC transmission system.

In passing, the transmitting device 299 is to use the same thing as in FIG. 19.

As to blocks which are being used, since blocks with the same numbers become to be of the same explanations as things which were explained in the embodiments 1, 2 etc., explanations will be omitted.

A point on which this embodiment is different from a conventional system is such a point that a decision signal from the decision unit 380 is inputted to the channel estimation unit 370.

Normally, as shown in FIG. 6, prior to communication start etc., transmission channel estimation is carried out once, and next transmission channel estimation will be carried out in case that a transmission channel fluctuated significantly, and in case that it exceeded maximum time of a cycle for carrying out transmission channel estimation, and so on. It is normal to use an exclusive use frame as a transmission channel estimation frame in this case.

However, transmission efficiency is deteriorated depending on the number of transmission channel estimations. Thus, in this system, by configuring the channel estimation unit 370 and the decision unit 380 as a circuit configuration of a decision feed-back type, in CINR which is obtained at the time of transmission channel estimation, dispersion from a decision value in each sub carrier is obtained as CINR, and thereby, transmission channel estimation is to carried out not only in a transmission channel estimation frame but also in a normal data frame.

Figure 9:
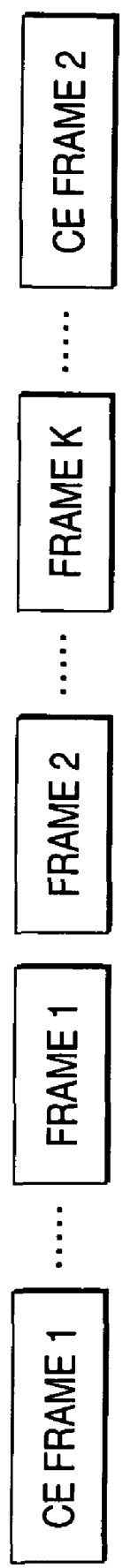
FIG. 9 is a frame configuration view in such a case that transmission channel estimation is carried out by use of a transmission channel estimation exclusive use frame and a data frame.

FIG. 9 is a frame configuration view in case of carrying out transmission channel estimation by use of a transmission channel estimation exclusive use frame and a data frame.

It is conceivable that there occurs a difference between a result of transmission channel estimation which was carried out because of transmission channel fluctuation at the time of communication start, and transmission channel estimation which is carried out in a data frame. At this time, in case that a difference occurred with such a degree that an error is generated in a result of transmission channel estimation which was measured in a transmission channel estimation frame, and a result of transmission channel estimation which was measured in a data frame, updating of a transmission channel estimation result is requested to the transmitting device 299 side, and thereby, a transmission channel estimation result is updated. In case of updating, a result, which was obtained in the data frame, may be used. Transmission channel estimation may be carried out by using an exclusive use frame again. In passing, the decision feed back type circuit configuration of the receiving device of this embodiment is applicable also to the receiving device of the embodiment 1 or 2.

By the suchlike configuration, it is possible to carry out transmission channel estimation by use of a normal transmission channel estimation exclusive use frame and a data frame, and therefore, as a result, it is possible to heighten transmission efficiency.

Embodiment 6

A channel estimation unit, which is used in a communication apparatus in an embodiment 6 of this invention, will be described. Here, as a configuration of a communication apparatus, used is the configuration of the communication apparatus of the embodiment 5. A point, which is different from the embodiment 5, is a transmission channel estimating method by use of a data frame of the channel estimation unit 370.

In case of carrying out transmission channel estimation, required is an average of a symbol, which is a target for averaging noise, or more (the number of necessary symbols is assumed to be S). However, there is no such guarantee that each data frame is composed of S symbol or more. On that account, a unit to be averaged is set to S symbol unit, but not a frame unit, and averaging is to be continued until reaching to the S symbol, even if a frame is changed.

Concretely speaking, a channel estimation unit carries out averaging in a form which is as follows.

Generally, a channel estimation unit 370 can complete transmission channel estimation in 1 frame, if symbol number necessary for transmission channel estimation is entered in 1 frame which is received by a receiving device.

However, if a frame, which is not for transmission channel estimation but for exchanging normal data, is used for transmission channel estimation, there occurs such a case that only several symbols exist in payload data.

On that account, by use of a plurality of frames, arises a necessity to carry out 1 time transmission channel estimation which corresponds to such a case that a transmission channel estimation exclusive use frame was used.

For example, assuming that 1 frame is configured of a preamble signal necessary for control of a receiving device and a payload data signal for sending information, when the number of symbols necessary for transmission channel estimation is assumed to be 128, the number of symbols in payload data which is included (can be used for transmission channel estimation) in a frame when communication is going on is assumed to be 8.

In this case, a channel estimation unit becomes to be able to obtain a 128 symbol averaged transmission channel estimation result (the same level as normal transmission channel estimation) with 16.times.8=128, by receiving 16 frames of a reception signal.

By the suchlike configuration, it is possible to carry out transmission channel estimation by use of a data frame, in accordance with various frame length, and therefore, as a result, it is possible to heighten transmission efficiency.

Embodiment 7

A channel estimation unit 370 of a communication apparatus in an embodiment 7 of this invention will be described. As a block configuration of the communication apparatus of this embodiment, used is the block configuration of the communication apparatus which was described in the conventional system as shown in FIG. 19 or in the embodiment 5.

In this embodiment, since an operation of the channel estimation unit 370 of a receiving device in the communication apparatus is different from that of another embodiment, the operation will be hereinafter described.

In communication which uses a power line as a transmission channel, as to a use band in an existing system, only a portion (e.g., amateur radio use band) is made to be always non-use. In other bands than it, it is normal to not send out a signal as to a sub carrier which became non-use by a transmission channel estimation result.

However, if nothing is done, in case of carrying out transmission channel estimation in a data frame, it is not possible to carry out transmission channel estimation in a sub carrier which is of non-use. Thus, even in the suchlike sub carrier, pseudo data is given, and thereby, transmission channel estimation is made to be carried out in a data frame.

Since decision data of a decision feed-back type is used in a data frame, as to the pseudo data here, it is convenient to fix a modulation scheme, and it is good to use a minimum modulation scheme (e.g., 2PAM) from the view point of a resistance property.

By the suchlike configuration, it becomes possible to carry out transmission channel estimation by use of a data frame, even in a sub carrier which became non-use by a transmission channel estimation result, and as a result, it become possible to heighten transmission efficiency.

Embodiment 8

A channel estimation unit of a communication apparatus in an embodiment 8 of this invention will be described. As to a block configuration of the communication apparatus of this embodiment, used is the block configuration of the communication apparatus which is described in the embodiment 1, 2 or 5, and as an operation of the channel estimation unit 370, transmission channel estimation is carried out at a plurality of times.

As an operation of the channel estimation unit 370 in case of carrying out transmission channel estimations at a plurality of times, how to determine a transmission channel estimation value will be shown.

Transmission channel estimation of the channel estimation unit 370 is carried out by measuring CINR in each sub carrier in a reception signal, but since a transmission channel fluctuates periodically or non-periodically, in case of a transmission channel such as a power line, in case that transmission channel estimation was carried out at a plurality of times, a transmission channel estimation value of each sub carrier shows almost the same value, and fluctuates significantly.

Figure 10:
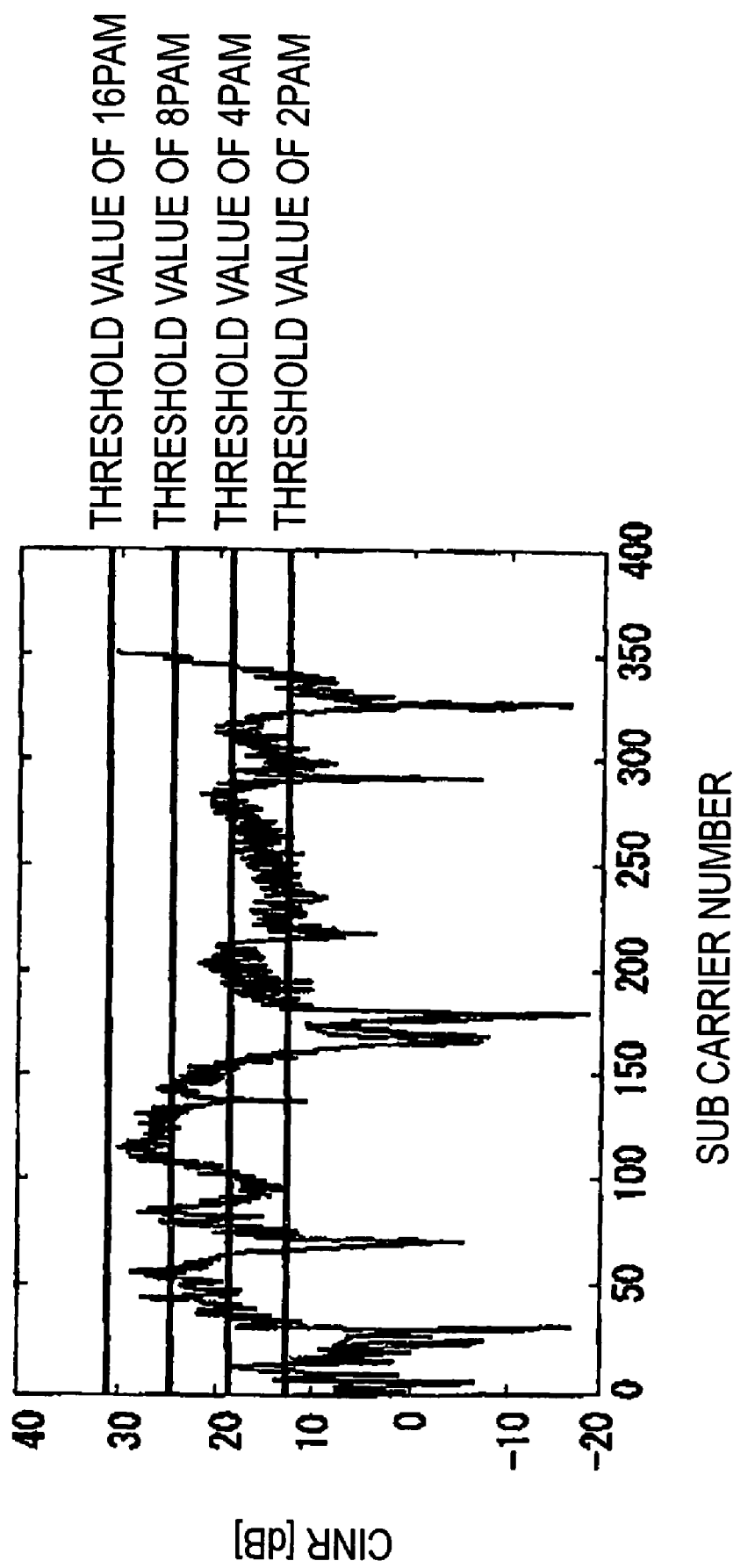
FIG. 10 is a graph which shows CINR in such a case that there was almost no transmission channel fluctuation in case that transmission channel estimation was carried out at a plurality of times.

FIG. 10 is a graph which shows CINR in case that there was almost no transmission channel fluctuation in case that transmission channel estimation was carried out at a plurality of times.

In case of FIG. 10, there is simply influence due to only background noise such as Gauss noise. In this case, it is preferable that the channel estimation unit 370 uses a maximum value in each sub carrier as an initial value, to a result which was obtained by transmission channel estimations at a plurality of times, and uses a median in case that retransmission from the transmitting device 299 becomes to occur at many times, and uses a minimum value if communication does not become stable.

Here, as to the median, since calculation such as SORT becomes enormous, a difference (e.g., 2 dB) of the maximum value and the median has been obtained statistically, and by utilizing that value and the maximum value, it is also possible to obtain a result which is equivalent to that at such time that the median was used.

By realizing the suchlike configuration, it becomes possible to maintain transmission efficiency at the highest level in tune with each transmission channel.

Embodiment 9

The channel estimation unit 370 of a communication apparatus in an embodiment 9 of this invention will be described. A block configuration of the communication apparatus in this embodiment is the same block configuration as that described in the embodiment 8. In this embodiment, as a transmission channel for which the channel estimation unit 370 estimates, considered is almost the same transmission channel as the transmission channel which was considered in the embodiment 8.

As a point which is different from the embodiment 8, it is on such a point that considered is such a case that background noise is not Gauss distribution, and also, depending on an attenuation characteristic of a transmission channel (e.g., such a case that CINR values of many sub carriers exist in the vicinity of a threshold value, etc.), as a threshold value, which is used when a primary modulation system to be used in a symbol mapper of a transmitting device from CINR which was obtained by transmission channel estimation, a value which is set up in the beginning becomes improper.

The channel estimation unit 370 in this embodiment, on the basis of the above-described knowledge, controls in such a manner that transmission efficiency in an entire system including retransmission etc. is improved, by changing setup of each threshold value higher (i.e. by setting them to have a margin). This is because there is such a case that, depending on a distribution of CINR, transmission efficiency is changed significantly by simply changing a threshold value. By the suchlike configuration, it becomes possible to further heighten transmission efficiency, more than that of the communication apparatus in the embodiment 8.

Embodiment 10

Figure 11:
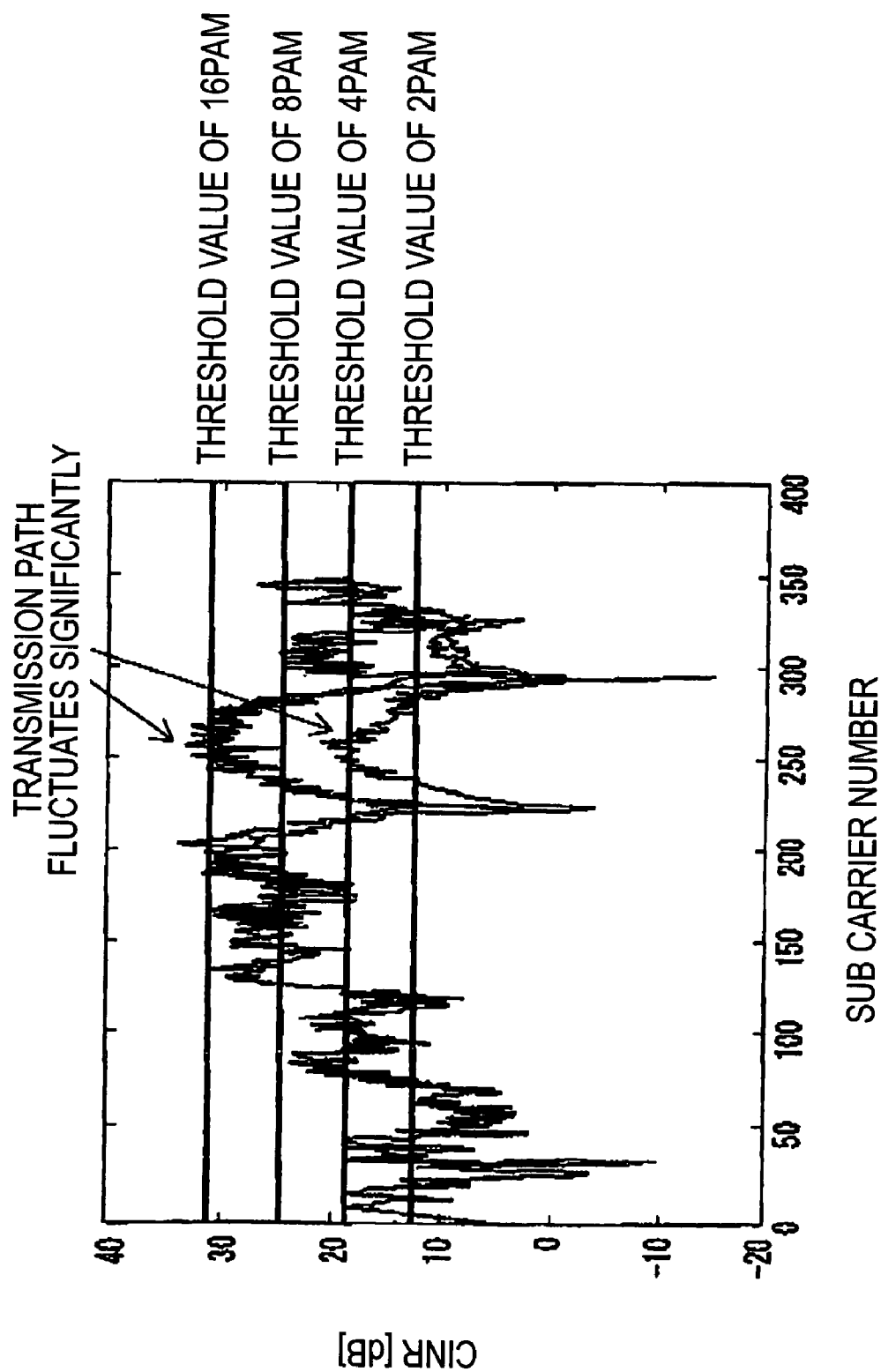
FIG. 11 is a graph which shows CINR in such a case that there is transmission channel fluctuation in case that transmission channel estimation was carried out at a plurality of times.

The channel estimation unit 370 of a communication apparatus in an embodiment 10 of this invention will be described. In this embodiment, considered is a transmission channel which is almost the same as the transmission channel which was considered in the embodiment 8. As a point which is different from the embodiment 8, it is on such a point that a transmission channel characteristic fluctuates significantly, in case that a plurality of transmission channel estimation results, which were obtained, were viewed. In FIG. 11, shown is a graph which shows CINR in case that there is transmission channel fluctuation in case that transmission channel estimation was carried out at a plurality of times. In the suchlike transmission channel, every time transmission fluctuation occurs, errors are increased, depending on its range, and there is such a possibility that, even if error correction is carried out, a frame at that time becomes to be retransmitted.

Thus, the channel estimation unit 370 in this embodiment, on the basis of the above-described knowledge, can control in such a manner that transmission efficiency in an entire system including retransmission etc. is improved, by making non-use to such a sub carrier that its fluctuation is large, to CINR which was obtained in each sub carrier, or by reducing retransmission by selecting a minimum value in results which were obtained.

By the suchlike configuration, it becomes possible to further heighten transmission efficiency, more than that of the embodiment 8.

Embodiment 11

The channel estimation unit 370 of a communication apparatus in an embodiment 11 of this invention will be described. In this embodiment, considered is a transmission channel which is almost the same as the transmission channel which was considered in the embodiment 10.

As a point which is different from the transmission channel of the embodiment 10, it is on such a point that transmission channel fluctuation occurs in synchronization with a power supply cycle or its half cycle, by use of a power line as a transmission channel.

In a transmission channel as shown in FIG. 11, every time transmission channel fluctuation occurs, errors are increases, depending upon its range, and there is such a possibility that, even if error correction is carried out, a frame at that time becomes to be retransmitted.

At this time, to a request of transmission channel estimation, when it is processed by 1 time transmission channel estimation, there is such a possibility that it is estimated lower than true transmission channel capacity, depending on transmission channel estimation timing. In this case, as a system, it may operate stably, but a transmission speed slows.

Under such an environment that a buffer etc. are sufficiently provided on a upper layer and influence due to retransmission may not be considered, it is desirable that a transmission channel estimation result is obtained at a level which is close to the true transmission channel capacity if possible.

Thus, the channel estimation unit 370 in this embodiment, on the basis of the above-described knowledge, is designed to carry out transmission channel estimation 2 times with timing which is not synchronized with a power supply cycle or its half cycle, to a transmission channel estimation request, and to select a value in which CINR is larger, in each sub carrier, by utilizing a transmission channel estimation result which was obtained. By this, as to at least 1 time among 2 times of transmission channel estimations, it is possible to carry out transmission channel estimation without stumbling across transmission channel fluctuation which was synchronized with a power supply cycle. In addition, since a better result of CINR is taken in each sub carrier, a transmission speed is maintained at a high level.

By the suchlike configuration, it is possible to carry out good transmission channel estimation, even under such a power line transmission channel environment that there is transmission channel fluctuation which was synchronized with a power supply cycle, by simple processing.

Embodiment 12

The channel estimation unit 370 of a communication apparatus in an embodiment 12 of this invention will be described. In this embodiment, considered is a transmission channel which is almost the same as the transmission channel which was considered in the embodiment 10.

Figure 23:
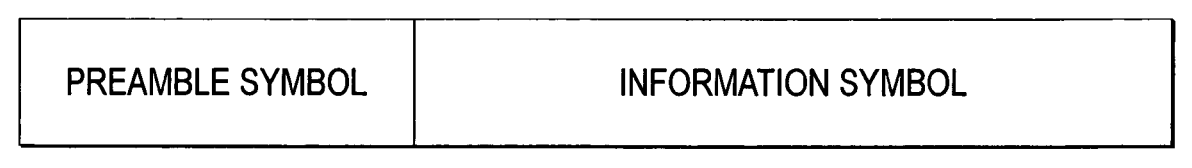

FIG. 23 is a view which shows a configuration example of an inside of a transmission frame in a DWMC transmission system.

It is assumed that a frame configuration of a reception signal is transmitted by a frame which is composed of a preamble signal necessary for synchronization and equalization processing and a signal for information as in FIG. 23. Normally, it is understood that condition of a power line transmission channel changes vary slowly, as compared to a wireless transmission channel. In addition, as instantaneous fluctuation, it is generated by ON/OFF of an electric equipment, and soon. Further, transmission channel fluctuation which was synchronized with a power supply, and so on, are also conceivable.

The channel estimation unit 370 in this embodiment, on the basis of the above-described knowledge, is enough if it carries out transmission channel estimation in a manner of a long cycle (at an interval from second to minute), to very slow transmission channel fluctuation, and has a necessity to carry out re-transmission channel estimation since a transmission channel state changes significantly, to instantaneous fluctuation due to ON/OFF of an electric equipment. Since it is possible to predict where periodic fluctuation of a transmission channel occurs, by use of the communication apparatus of the embodiment 1 or 2, in the same manner as in the embodiment 8, to periodic transmission channel fluctuation which was synchronized with a power supply, it is possible to suppress an amount of data which is retransmitted although an overhead of a preamble is increased, by carrying out no signal transmission in that time, or by finely dividing a frame.

By the suchlike configuration, since it is possible to reduce an amount of data to be retransmitted, it becomes possible to heighten transmission efficiency.

Embodiment 13

The channel estimation unit 370 of a communication apparatus in an embodiment 13 of this invention will be described. In this embodiment, as a block configuration of a communication apparatus, used is the block configuration of the communication apparatus of the conventional system of FIG. 19 or the embodiment 1 or 2.

In case of carrying out normal transmission channel estimation, as shown in FIG. 10 and FIG. 11, CINR is obtained, and primary modulation, which is used in a symbol mapper of a transmitting device, is determined, and each parameter is set up so as to transmit with maximum efficiency in a transmission channel through which communication is carried out.

However, depending on a state, there is also such a case that it is possible to carry out an operation of a system stably, by adaptively giving redundancy to a transmission system.

The communication apparatus of this embodiment carries out an operation as follows, on the basis of the above-described knowledge.

The channel estimation unit 370, in case that a transmission channel itself is not congested and in case that an amount of data to be transmitted is smaller than transmission channel capacity (capacity which was obtained by transmission channel estimation), is operated so as to lower by 1 rank (e.g., from 4PAM to 2PAM), to a modulation scheme which is decided in the vicinity of a threshold value, or to give a margin (e.g., 2 dB) to all threshold values, or further, to determine a modulation scheme by use of a minimum value in case that transmission channel estimation is carried out at a plurality of times.

Since these systems are designed so as to have a spectrum of a low side lobe in each sub-carrier by use of wavelet transformation, they become possible because detailed CINR is obtained in each sub carrier by the channel estimation unit 370.

In passing, this system is applicable not only to the wavelet transformation, but also to multi-carrier communication which realizes another low side lobe spectrum, by use of OFDM/OQAM (in this case, a modulation scheme is MQAM: M is a multi-value number), Filtered OFDM, Filtered Multitone systems etc.

In addition, this system is also applicable to a FET (Fast Fourier Transform) based multi-carrier communication system in which a characteristic is deteriorated but which has been often used since old times.

By the suchlike configuration, it is possible to carry out optimization in a total system including a transmission channel, and furthermore, it is possible to carry out stable communication.

Embodiment 14

The channel estimation unit 370 of a communication apparatus in an embodiment 14 of this invention will be described.

In this embodiment, as a block configuration of a communication apparatus, used is the power line communication apparatus of the conventional system of FIG. 19 or the embodiment 1 or 2.

In case of carrying out normal transmission channel estimation, as shown in FIG. 10 and FIG. 11, CINR is obtained, and primary modulation, which is used in a symbol mapper of a transmitting device, is determined, and each parameter is set up so as to transmit with maximum efficiency in a transmission channel through which communication is carried out.

However, depending on a state, there is also such a case that it is possible to carry out an operation of a system stably, by adaptively giving redundancy to a transmission system.

The channel estimation unit 370 of this embodiment carries out an operation as follows, on the basis of the above-described knowledge.

In case that a transmission channel itself is not congested and in case that an amount of data to be transmitted is smaller than transmission channel capacity (capacity which was obtained by transmission channel estimation), by receiving information of types (Voip, data, Streaming etc.) of data to be sent from a upper layer, since there is no necessity of instancy in case of data such as a file etc. (although there is a possibility that retransmission occurs, since it is not data which is request for real-time, there is no problem), communication is carried out by a normal transmission system in consideration of maximum efficiency, and in addition, since instancy is important in Voip communication, on the assumption that stability is more important than efficiency, it is conceivable that a modulation scheme, which is close to minimum, is made to be selected in each sub carrier if transmission channel capacity is sufficient, or a resistance property is given to a frame itself by carrying out frequency diversity or time diversity, or further, since video images are transmitted in Streaming etc., capacitance and instancy, which is not of a level of Voip, become necessary, and therefore, in this case, by realizing the very minimum multi-values in a form which was tuned with information which is desired to be sent, a modulation scheme of each sub carrier is determined.

These systems become possible since they are designed so as to have a spectrum of a low side lobe in each sub-carrier by use of wavelet transformation, and detailed CINR is obtained in each sub carrier by a transmission channel estimator. In passing, this system is applicable not only to the wavelet transformation, but also to multi-carrier communication which realizes another low side lobe spectrum, by use of OFDM/OQAM (in this case, a modulation scheme is MQAM: M is a multi-value number), etc. In addition, this system is also applicable to a FET (Fast Fourier Transform) based multi-carrier communication system (for example, ADSL, 802.11a and g) in which a characteristic is deteriorated but which has been often used since old times.

By realizing the suchlike configuration, it is possible to carry out optimization in a total system including a transmission channel by carrying out transmission channel estimation in consideration of an application, and furthermore, it is possible to carry out stable communication.

Embodiment 15

The channel estimation unit 370 of a communication apparatus in an embodiment 15 of this invention will be described.

In this embodiment, as a block configuration of a communication apparatus, used is the block configuration of the communication apparatus of the conventional system of FIG. 19 or the embodiment 1 or 2.

When a desired transmission speed was not satisfied in case that transmission channel estimation was carried out by a normal method, there is such a possibility that it is not possible to take desired CINR on account of collapse of orthogonality of a wavelet filter bank due to group delay of a transmission channel.

Normally, demodulation processing is carried out in a receiving device, in synchronization with a reception signal, but it does not mean that synchronization is realized to all sub carriers.

In short, on an actual transmission channel, such a possibility that collapse of orthogonality occurs easily is high. In a transmission channel, since a sub carrier, which is located in a band in which large group delay exists, is such a thing that collapse of orthogonality is large, large inter-carrier interference and inter-symbol interference occur. As a result of that, in that band, since a interference wave exists, CINR is estimated to be low.

In order to solve this problem, in the communication apparatus of this embodiment, a sub carrier, which can be used, is limited to, for example, only a sub carrier which has an even number.

By this frequency utilization efficiency is lowered, but inter-carrier interference due to collapse of orthogonality can be reduced significantly, and therefore, even if a sort of group delays exist, it is not almost affected by inter-carrier interference, and therefore, there is such a possibility that a transmission speed is improved as a total system. In addition, since there occurs almost no overlap with an adjacent carrier, there is a resistance property to frequency deviation.

Figure 22:
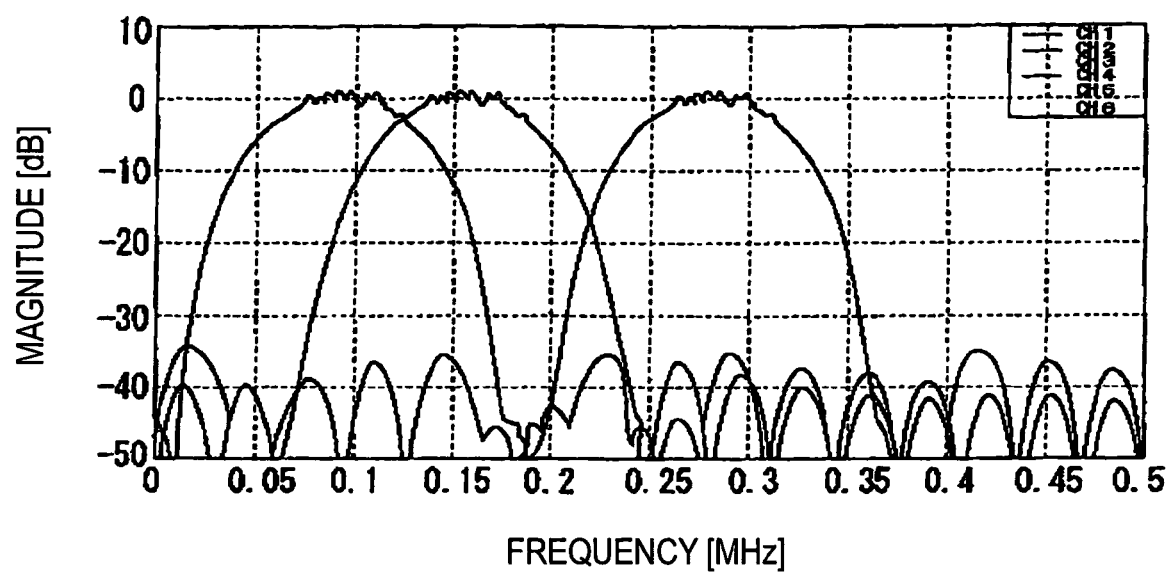
FIG. 22 is a view which shows a transmission spectrum example in the DWMC transmission system.
Figure 24:
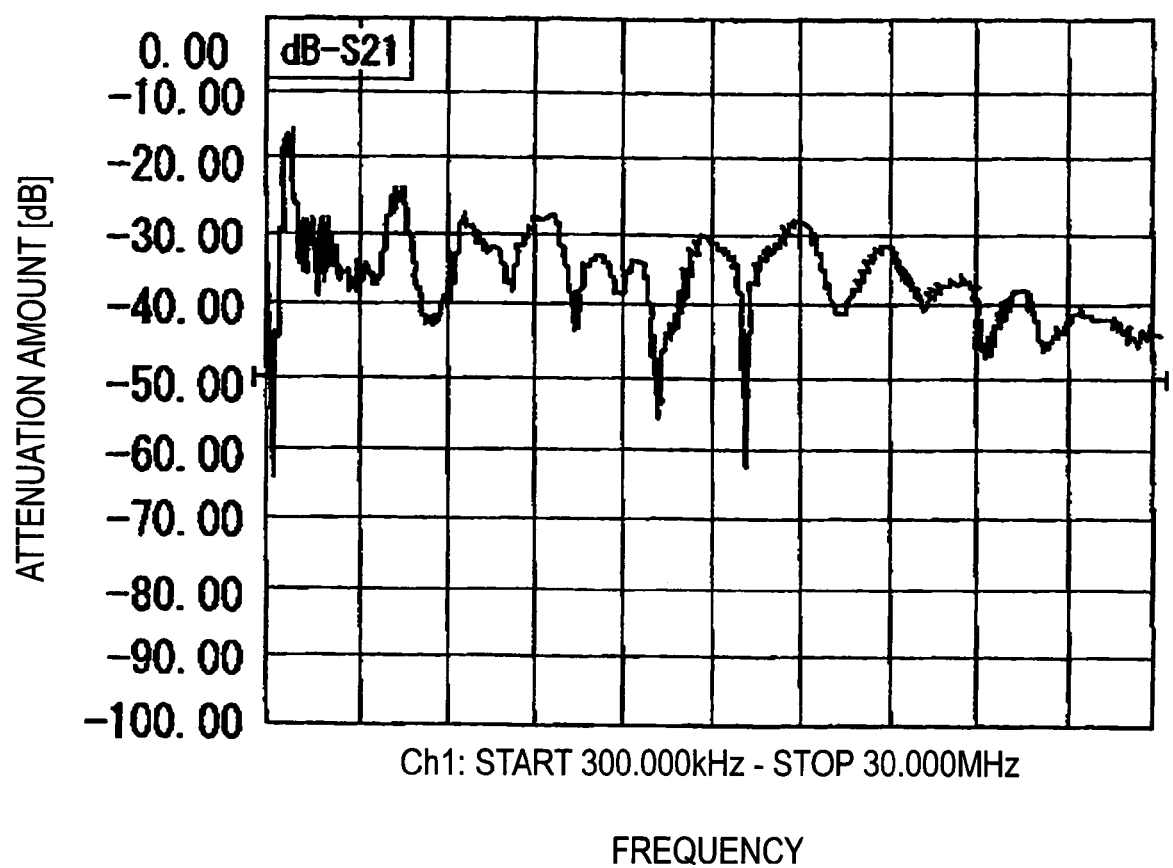
FIG. 24 is a view which shows an attenuation characteristic of a power line transmission channel.
Figure 25:
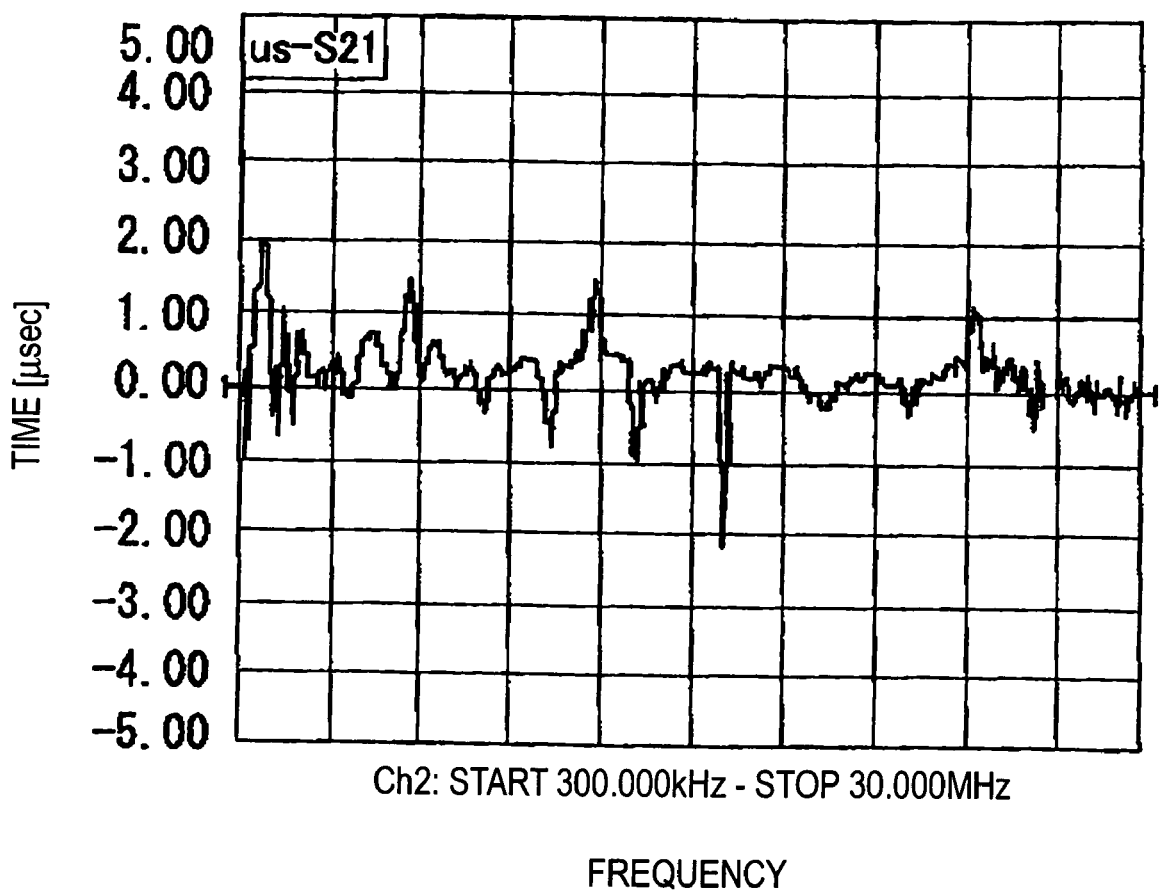
FIG. 25 is a view which shows a group delay characteristic of a power line transmission channel.

FIG. 22 is a view which shows a transmission spectrum example in a DWMC transmission system.

By realizing a configuration as in FIG. 22, frequency utilization efficiency is lowered, but in a transmission channel in which group delay deviation is large, inter-carrier interference can be reduced significantly, and in addition, there is a resistance property to frequency deviation, and therefore, there is such a possibility that a transmission speed is improved as a total system.

Embodiment 16

The channel estimation unit 370 of a communication apparatus in an embodiment 16 of this invention will be described.

In this embodiment, as a block configuration of a communication apparatus, used is the block configuration of the communication apparatus of the conventional system of FIG. 19 of the embodiment 1 or 2.

In case that a desired transmission speed is not satisfied in case that transmission channel estimation was carried out by a normal method, it is conceivable that a transmission channel is in a very bad environment. Under the very bad environment, transmission efficiency is lowered more in delay detection than synchronous detection, but since there is a resistance property, there exists such a case that it is desired to be used, but DWMC is Real modulation, and there is no phase in each sub carrier, and therefore, the delay detection is not possible.

However, there is such a method that delay detection by use of a phase becomes possible even in DWMC, by giving redundancy to transmission data.

The channel estimation unit 370 in this embodiment, on the basis of the above-described knowledge, carries out an operation as follows.

In case that an impulse response length is assumed to be 4T (T represents a symbol cycle) of Wavelet (speaking of a filter length, 4M: M is the number of all sub carriers), data to be transmitted in each sub carrier is assumed to be the same in 4T zone. Transmission efficiency becomes 0.25, but at the minimum, it is possible to handle the same phase as FET every 4T, and delay detection becomes possible.

This utilizes such a nature that, even in case of DWMC, if 4t continued information is used, at the minimum, it becomes a sine wave every 4T. As a matter of course, if an impulse response length of Wavelet becomes 8T, there is such a necessity that data to be transmitted in each sub carrier is made to be the same in 8T zone. In passing, because of such a fact that it is possible to handle a phase, various technologies, which are used in normal digital communication, becomes to be applicable to DWMC. Since transmission efficiency is deteriorated when the above-described processing is carried out to all data, even by simply using for the very minimum portion, a system can be improved. For example, by applying only to a preamble signal and a pilot signal, it is possible to improve system performance.

By realizing the suchlike configuration, redundancy is given to information which is desired to be sent, only by the same length as an impulse response length of Wavelet, and thereby, transmission efficiency is deteriorated but a phase can be handled, and therefore, delay detection becomes possible, and further, various technologies, which are being used in normal digital communication, can be applied to DWMC, and in addition, even in case that it is applied to a portion, it is possible to improve system performance.

Embodiment 17

The channel estimation unit 370 of a communication apparatus in an embodiment 17 of this invention will be described.

In this embodiment, as a block configuration of a communication apparatus, used is the block configuration of the communication apparatus of the conventional system of FIG. 19 or the embodiment 1 or 2.

In this embodiment, it is assumed that output power of the transmitting device 299 is smaller than maximum power, or maximum power required by the law.

The communication apparatus, in case that it did not satisfy a desired transmission speed in case that transmission channel estimation was carried out by a normal method, calculates how much gain of an amplifier of the transmitting device has to be increased so as to realize the desired transmission speed, by use of a transmission channel estimation result at that time, and on the basis of that calculation result, controls transmission power of the transmitting device 299.

Normally, in Wavelet based multi-carrier communication, a sub carrier, which is using the same band as a band which is used by a partial existing system (e.g., amateur radio etc.), is made to be of non-use since it becomes an obstacle to a existing system. By making a sub carrier non-use, a notch is formed.

Figure 12:
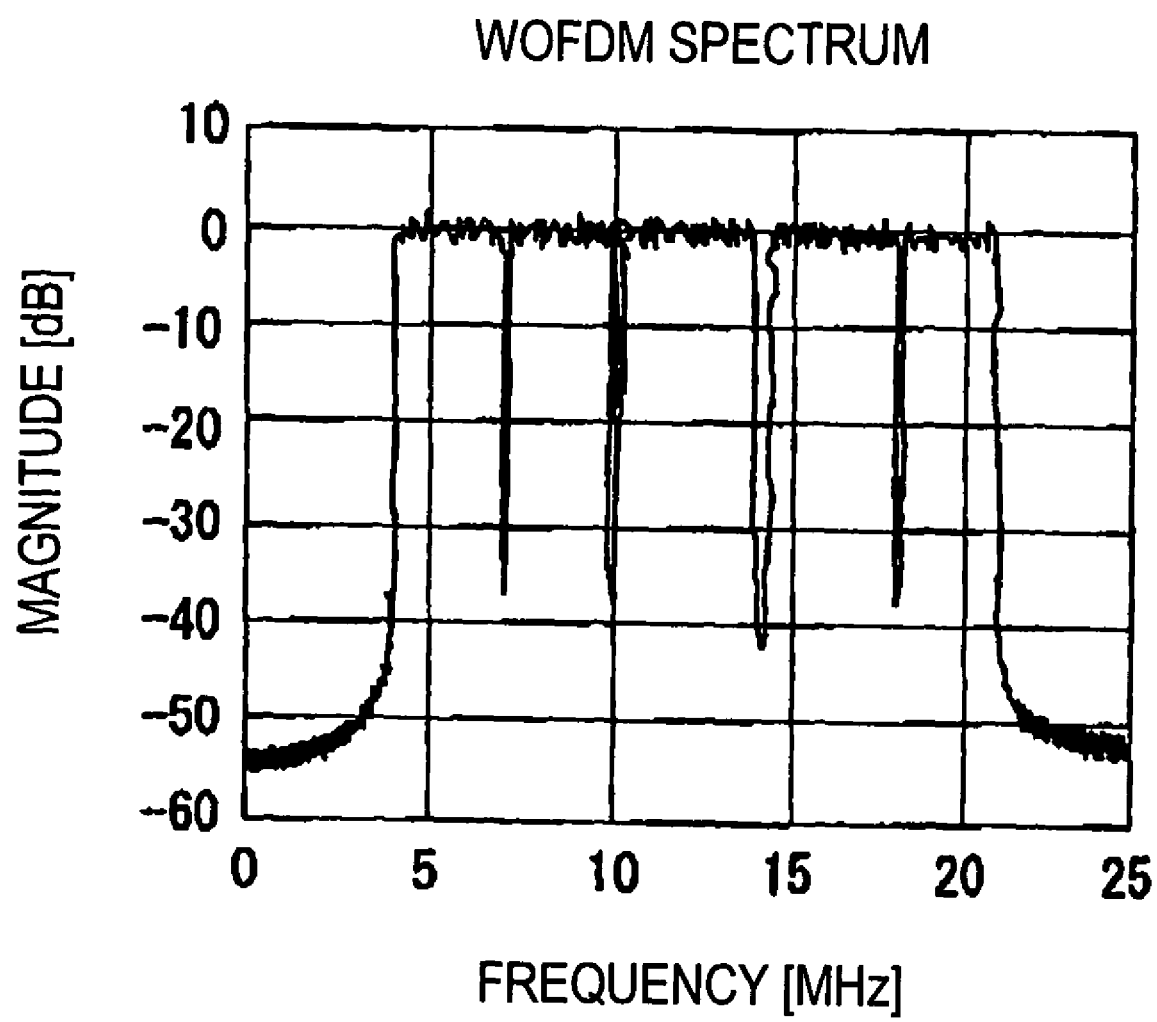
FIG. 12 is a view of an amplitude spectrum in a DWMC transmission system.

FIG. 12 is a view of an amplitude spectrum in a DWMC transmission system.

FIG. 12 shows an amplitude spectrum in such a case that a sub carrier, which is using the same band as a band which is used by amateur radio, was made non-use. As shown in FIG. 12, it shows that, by simply making several pieces of sub carriers non-use, a notch of 30 dB or more is formed.

This can be realized since a Wavelet based sub carrier is of a low side lobe amplitude spectrum. In FIG. 22, shown is a transmission spectrum example in the DWMC transmission system. A first side lobe of an amplitude spectrum of a sub carrier which is used here is −35 dB. However, when transmission power is increased, a side lobe of each sub carrier is lifted together, and therefore, interference to an existing system increases.

In order to prevent this, the channel estimation unit 370 in this embodiment, so as for the notch to become deeper only by such a portion that a gain of an amplifier of the transmitting device 299 was increased, further makes a sub carrier non-use in the vicinity of them.

In passing, since it has been known in advance how a side lobe of an amplitude spectrum is attenuated, an increase amount of a gain of an amplifier of the transmitting device 299 and the number of sub carriers which are made non-use are determined uniquely.

By realizing the suchlike configuration, even if transmission power of the transmitting device 299 is increased, there is no such a case that influence to another existing system is increased, and it becomes possible to transmit a signal to a longer way. Furthermore, these things can be responded flexibly, simply by making a plurality of sub carriers non-use.

Embodiment 18

The channel estimation unit 370 of a communication apparatus in an embodiment 18 of this invention will be described.

In this embodiment, as a block configuration of a communication apparatus, used is the block configuration of the communication apparatus of the conventional system of FIG. 19 or the embodiment 1 or 2, and to a transmission channel estimation request, transmission channel estimation is assumed to be carried out at a plurality of times. A dynamic range of a receiving device is assumed to be 40 dB.

The number of all sub carriers is assumed to be 300. Here, for ease of explanation, it is assumed that a transmission channel is a static transmission channel and does not move.

Firstly, in advance, by use of a non-signal zone, a noise level of a transmission channel is measured. The noise level is easily obtained by use of a coefficient of an equalizer and a gain of AGC.

Next, normal transmission channel estimation (a transmitting device makes transmission with maximum power) is carried out, and a reception signal level and a CINR value of each sub carrier are estimated. From the reception signal level and a noise level, SNR (signal power to noise power ratio) of a transmission channel is obtained in a simplified manner. As to SNR here, almost SNR that a transmission channel is obtained but, CINR, which is obtained at the time of transmission channel estimation is dependent on a dynamic range of a receiving device.

On that account, under such an environment that a dynamic range of a receiving device is insufficient, from a relation of an average SNR and an average CINR, it is possible to lower output power of the transmitting device 299 without deteriorating a transmission speed.

Figure 13:
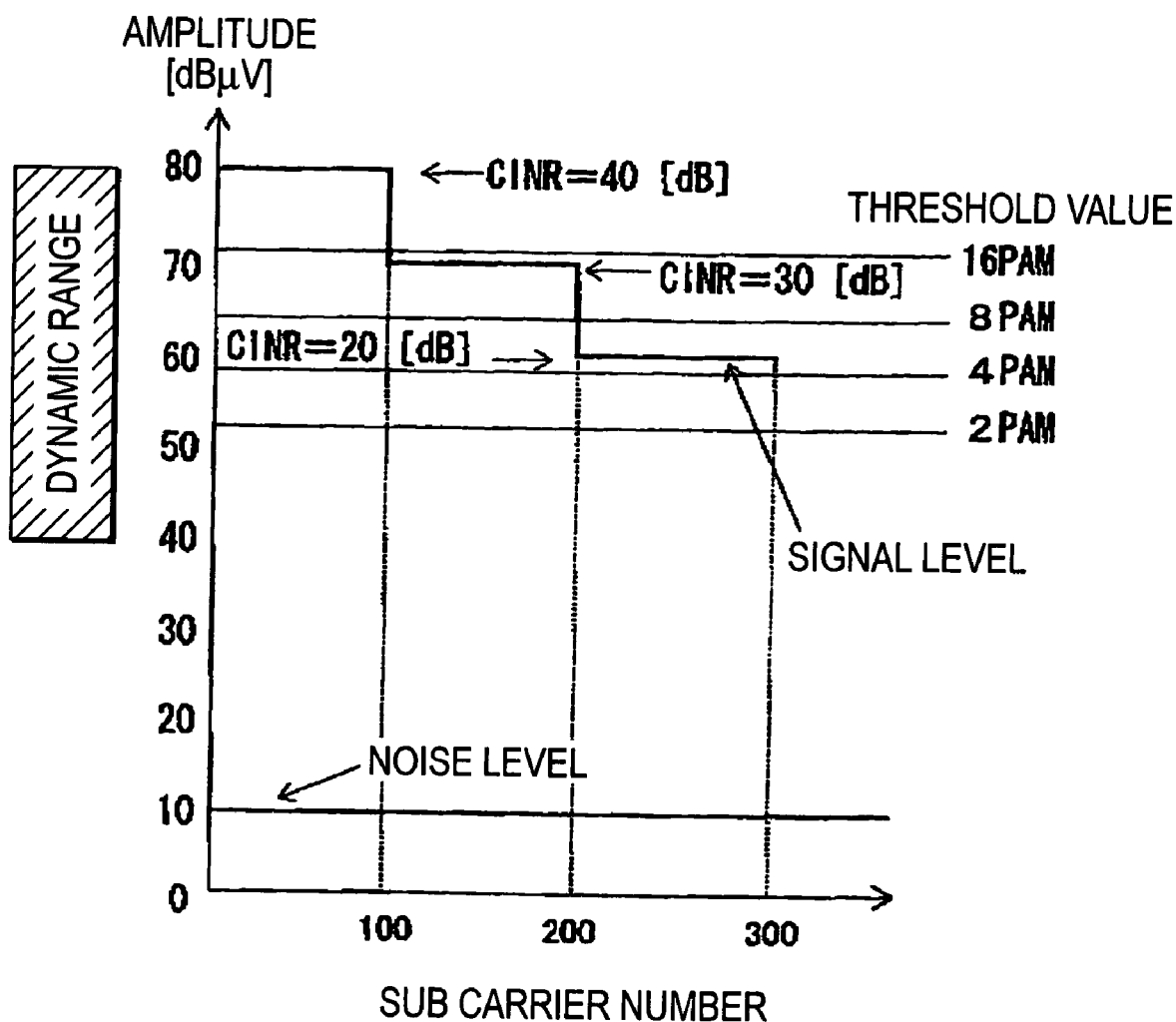
FIG. 13 is a pattern diagram of a level of a signal which was received.

FIG. 13 is a pattern diagram of a received signal revel.

FIG. 13 shows a noise level at the time of no reception signal, a signal level received by a receiving device when a transmitting device sent a signal with maximum power, and CINR which is obtained at the time of transmission channel estimation. In FIG. 13, in case that a transmitting device outputted with maximum power, a receiving device is receiving with maximum 80 dBμV, minimum 60 dBμV. In addition, CINR, which is obtained at the time of transmission channel estimation, becomes maximum 40 dB, minimum 20 dB, since a dynamic range of the receiving device is 40 dB. As to SNR of a transmission channel, it is 60 dBμV at the minimum, but as to CINR, it is simply 20 DB.

This means that transmission power is lost by 40 dB, since a dynamic range of the receiving device is simply 40 dB. Thus, by use of a gain difference between SNR of a transmission channel and CINR at the time of transmission channel estimation, it is possible to control transmission power of a transmitting device without effecting the transmission speed. By this configuration, it is possible to control the transmission power of the transmitting device based on a gain difference between SNR of a transmission channel and CINR obtained at the time of transmission channel estimation, to suppress power consumption of the transmitting device, and to reduce interference to another existing system.

Embodiment 19

The channel estimation unit 370 of a communication apparatus in an embodiment 19 of this invention will be described. It is assumed that a block configuration of a communication apparatus in this embodiment is the same block configuration of the communication apparatus as in the embodiment 18.

In the method of the embodiment 18, it was possible to suppress power consumption of the transmitting device by lowering transmission power, and to reduce interference to another existing system, but it was not possible to improve transmission speed.

In this embodiment, in addition to the characteristics of the embodiment 18, a method of improving a transmission speed of a communication apparatus will be described.

The channel estimation unit 370 obtains SNR of a transmission channel at the time of transmission channel estimation, in the same manner as in the embodiment .about. 18. Calculated is how much a gain can be lowered by, in each sub carrier, in order to realize a maximum transmission speed and minimum transmission power by use of SNR which was obtained in each sub carrier.

In case that transmission power is not controlled, a modulation scheme, which us used in each sub carrier, or information, which corresponds to it, is informed from a receiving device to the transmitting device 299, at the time of transmission channel estimation.

Here, in addition to that information, it is designed that information of a gain which is controlled in each sub-carrier is also informed. A transmitting device carries out primary modulation of each sub carrier by use of information of a multi-value level, and controls transmission power of each sub carrier by use of the gain information.

Figure 14:
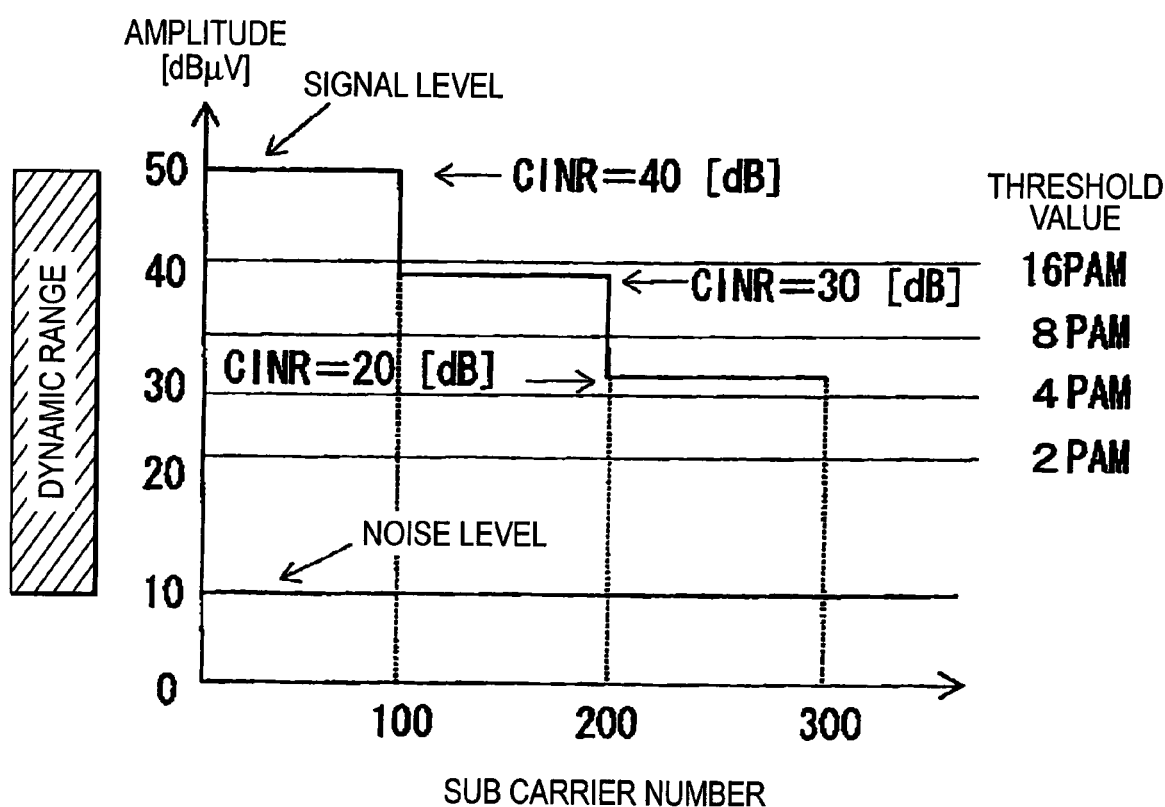
FIG. 14 is a pattern diagram at the time when a gain of an amplifier of a transmitting device was lowered by only 30 dB.

When this system is applied to a reception signal as shown in FIGS. 13, 14, SNR which is obtained in a receiving device becomes almost flat, and a transmission speed can be maximized. It is possible to accurately decide whether a transmission speed is kept maximum, by CINR.

In passing, under such a condition that all sub carriers, which lower a gain, select a maximum multi-value level, there is no necessity to send information of a multi-value level and information of a gain in a 2 divided manner, and it maybe fine if the multi-value level information or the gain information is informed from a receiving device to a transmitting device. In other words, there is such a necessity that a sub carrier, in which there is the gain information, lowers a gain of the sub carrier, by use of the gain information on such a matter that a multi-value level is a maximum multi-value level, and a sub carrier in which there is the multi-value level information is changed to multi-values by that information and is made not to control a gain. In this regard, however, under the suchlike condition, a reduction range of a gain becomes small.

By realizing the suchlike configuration, it is possible to improve a transmission speed as compared to the embodiment 18.

Embodiment 20

The channel estimation unit 370 of a communication apparatus in an embodiment 20 of this invention will be described. In this embodiment, as a block configuration of a communication apparatus, used is the block configuration of the communication apparatus of the conventional system of FIG. 19 or the embodiment 1 or 2.

The channel estimation unit 370 is designed to carry out transmission channel estimation at a plurality of times to a transmission channel estimation request.

Here, for ease of explanation, it is assumed that a transmission channel is a static transmission channel and does not move.

First of all, normal transmission channel estimation (a transmitting device makes transmission with maximum power) is carried out. From a transmission channel estimation result in a receiving device, only a gain of a sub carrier, which showed a maximum modulation scheme, is lowered by only a in a single uniform way. Here, a is obtained from a difference of threshold values which are used at the time of determining a modulation scheme. Also here, for ease of explanation, a use modulation scheme is set to 16PAM.about.2PAM, and a difference of each threshold value is set to 6 dB in a single uniform way. Here, a is 6 dB. A first time transmission channel estimation result is informed to the transmitting device 299 by a modulation scheme or information which corresponds to it, and such a fact that a second time transmission channel estimation will be carried out is also informed at the same time. In the second transmission channel estimation, the transmitting device 299 lowers a gain of only a sub carrier of the maximum modulation scheme (here, 16PAM) by only 6 dB to transmit, and in a receiving device, the second transmission channel estimation is carried out, and comparing with a first time result, if a transmission speed is lowered, transmission channel estimation is finished at the second time, and the last (here, first time) transmission channel estimation result is informed to the transmitting device 299 as a result to this time's transmission channel estimation request. If a transmission speed at the second time is faster than a transmission speed at the first time, third time transmission channel estimation is carried out. At the third time, by use of the transmission channel estimation result which was obtained at the second time, in the same manner, the transmitting device 299 lowers again of only a sub carrier of the maximum modulation scheme by only 6 dB, to transmit, and in the receiving device, third time transmission channel estimation is carried out.

In this operation, there is such a necessity that the transmitting device 299 lowers a gain of a sub carrier whose gain is lowered at both the first, second time, by only its sum 12 dB.

In short, when N-th time transmission channel estimation is carried out, used are a transmission channel estimation result which was obtained at (N−1)-th time and accumulated gains. Similar calculation is repeated until a transmission speed comes down, and at such a time point that the transmission speed came down, transmission channel estimation is stopped, and the last result is used as a final result. Here, a concrete example will be described by of FIGS. 13, 15.about.17.

Figure 15:
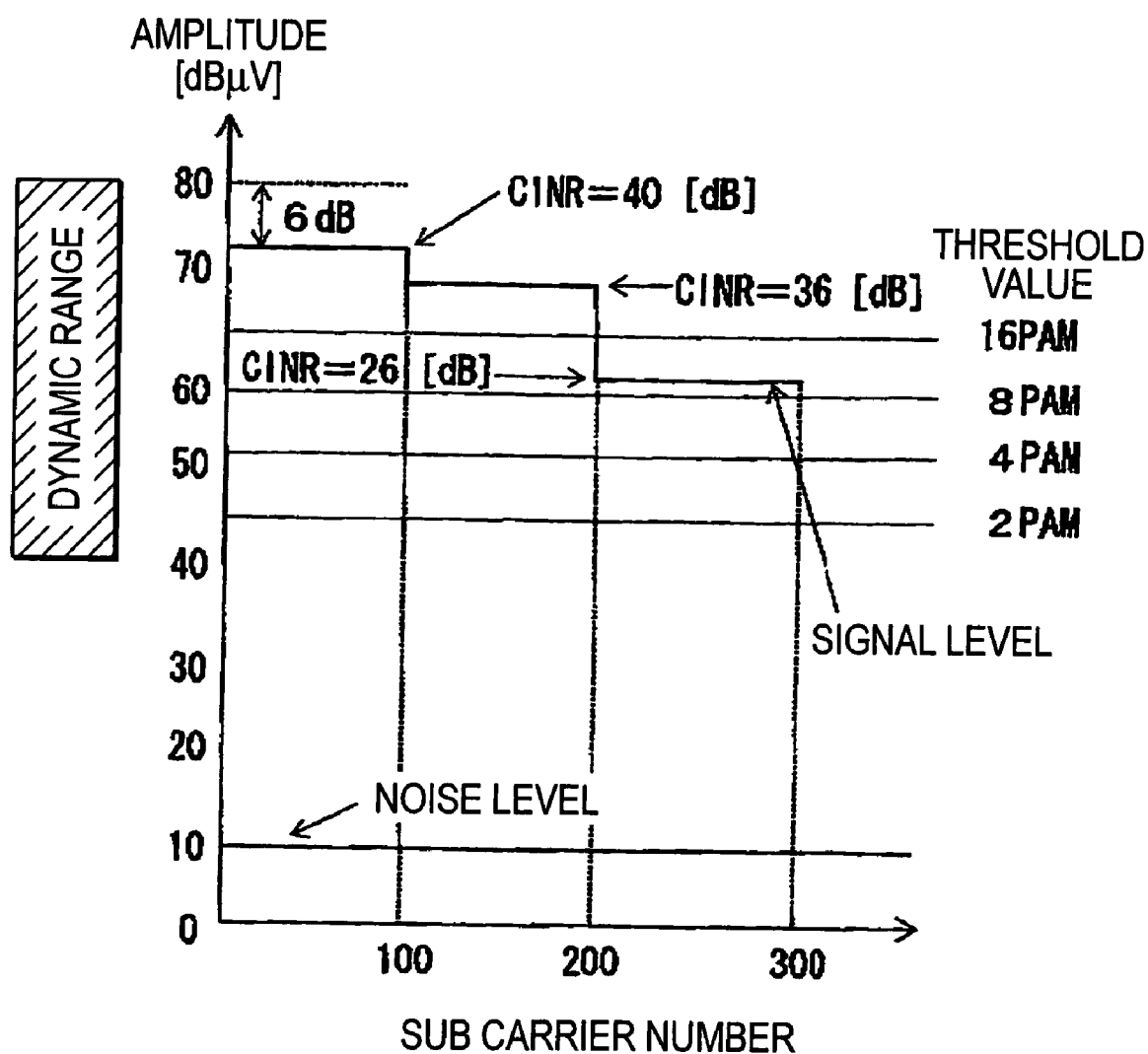
FIG. 15 is a pattern diagram of a level of a signal which is received at the time when gains of sub carriers up to sub carrier number 1~100 were lowered by only 6 dB.
Figure 16:
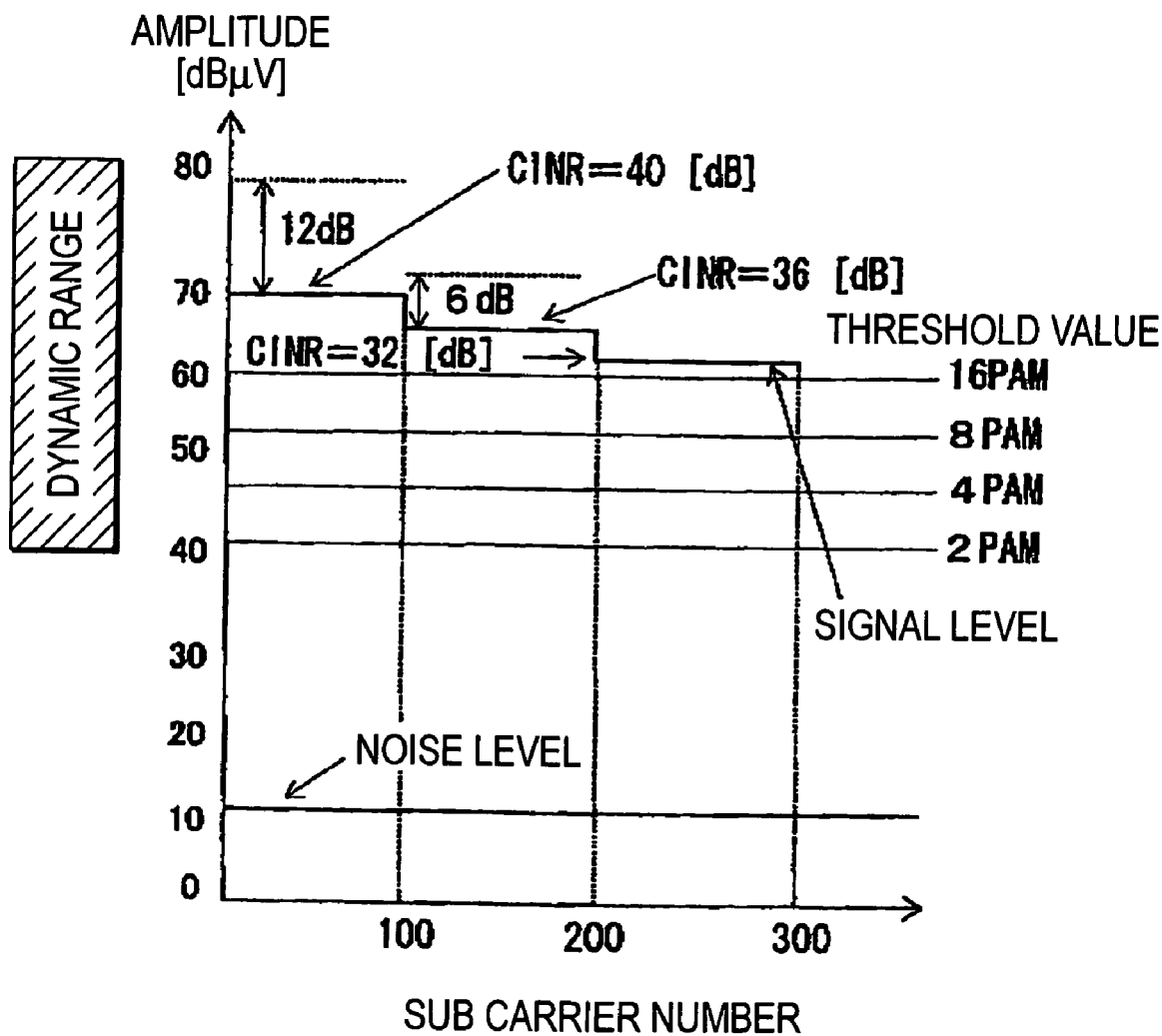
FIG. 16 is a pattern diagram of a level of a signal which is received at the time when gains of sub carriers up to sub carrier number 1~100 were lowered by 12 dB, and gains of sub carriers up to sub carrier number 101~200 were lowered by only 6 dB.
Figure 17:
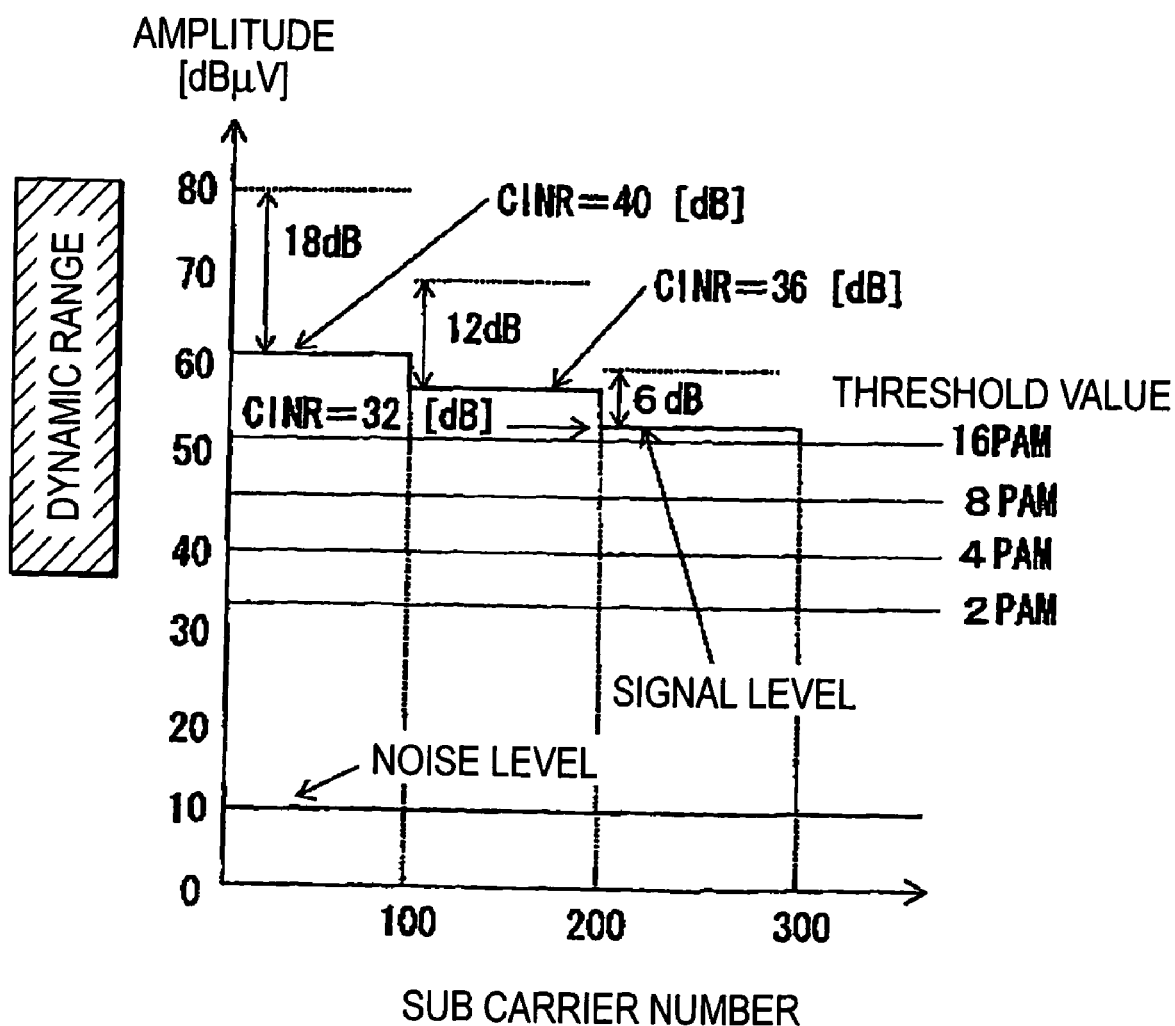
FIG. 17 is a pattern diagram of a level of a signal which is received at the time when gains of sub carriers up to sub carrier number 1~100 were lowered by 18 dB, and gains of sub carriers up to sub carrier number 101~200 were lowered by 12 dB, and gains of sub carriers up to sub carrier number 201~300 were lowered by only 6 dB.

FIG. 15 is a pattern diagram of a level of a signal which is received at the time when gains of sub carriers up to sub carrier numbers 1~100 were lowered by only 6 dB, and FIG. 16 is a pattern diagram of a level of a signal which is received at the time when gains of sub carriers up to sub carrier number 101~200 were lowered by only 6 dB, and FIG. 17 is a pattern diagram of a level of a signal which is received at the time when gains of sub carriers up to sub carrier number 1~100 were lowered by 18 dB, and gains of sub carriers up to sub carrier number 101~200 are lowered by 12 dB, and gains of sub carriers up to sub carrier number 201~300 are lowered by only 6 dB.

Firstly, normal transmission channel estimation is carried out. It is assumed that FIG. 13 is a pattern diagram of a level of a signal which was received. In case that a transmitting device outputted with maximum power from FIG. 13, a receiving device can receive with maximum 80 dBµV, minimum 60 dBµV. In addition, since a CINR value, which is obtained at the time of transmission channel estimation, becomes maximum 40 dB, minimum 20 dB, since a dynamic range of the receiving device is 40 dB. Here, gains of sub carriers up to sub carrier number 1.about.100, which are selecting the maximum modulation scheme (here, 16PAM), are lowered by 6 dB. Here, when second time transmission channel estimation is carried out, as shown in FIG. 15, CINR becomes 40 dB, 36 dB, 26 dB. In the same manner, gains of sub carriers up to sub carrier number 1.about.200, which selected 16PAM, is lowered by 12 dB, 6 dB. Here, when third time transmission channel estimation is carried out, as shown in FIG. 16, CINR becomes 40 dB, 36 dB, 32 dB. Here, all sub carriers become to select 16PAM. Thus, to all sub carriers, gains are lowered by 18 dB, 12 dB, 6 dB. In the same manner, when fourth time transmission channel estimation is carried out, 16PAM is selected in all sub carrier in the same manner as in the third time. Here, since a forth time's transmission speed and a third time's transmission speed become the same, processing is finished, and a third time's result is used for communication as a transmission channel estimation result at this time. In this example, a third time's speed and a fourth time's speed become the same by accident, but since an actual transmission channel characteristic is complex, there is generally no case that they become the same.

Thus, this processing is continued until such time that a transmission speed is deteriorated, and at such a time point that the speed was deteriorated, the last result is to be used as a transmission channel estimation result at that time.

In passing, for the purpose of simplifying a system, even in case that transmission channel estimation is used with limitation of 2 times, it is possible to effectively utilize a dynamic range of a receiving device by only a dB, as compared to such a case that this system is not used. In addition, a gain of only the maximum modulation scheme was lowered, but it is possible to obtain the same advantage even without limiting to the maximum modulation scheme (e.g., a gain is lowered in a sub carrier of 8PAM or more). By the such like configuration, transmission channel estimation has to be carried out at a plurality of times, but it is possible to control transmission power of a transmitting device by a simple produce, in a power line communication apparatus.

Further, in this embodiment, a gain of the transmitting device 299 was controlled by use of the CINR value, but it is also possible to carry out power control of the transmitting device 299 by use of SNR of each sub carrier.

Embodiment 21

The channel estimation unit 370 of a communication apparatus in an embodiment 21 of this invention will be described. Here, as a block configuration of a communication apparatus, used is the block configuration of the communication apparatus of the conventional system of FIG. 19 or the embodiment 1 or 2.

Figure 18:
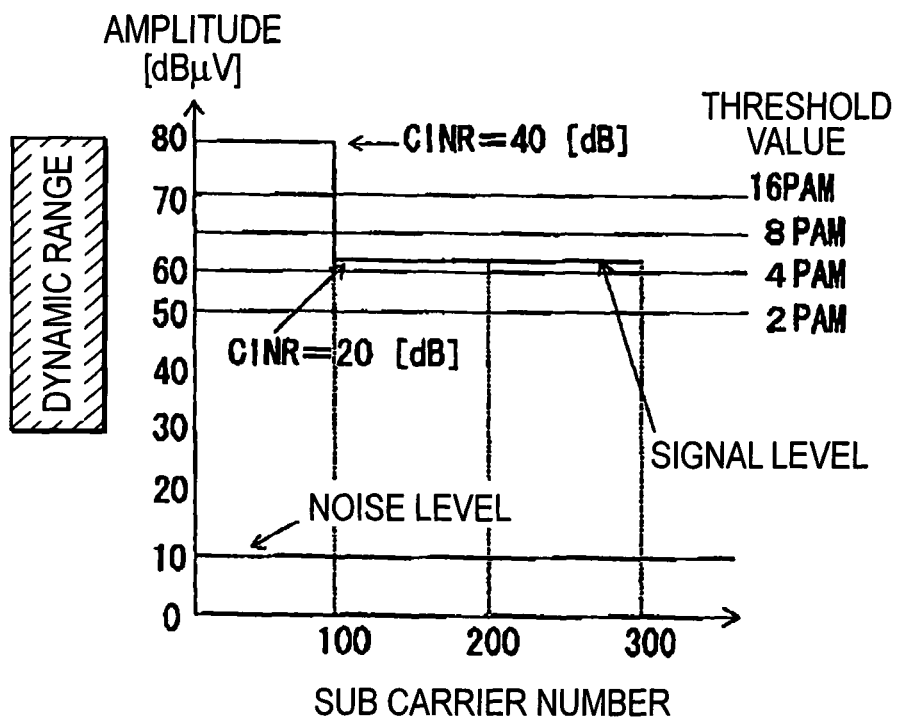
FIG. 18 is a pattern diagram of a transmission channel estimation characteristic in such a case that a dynamic range is insufficient.
Figure 18:
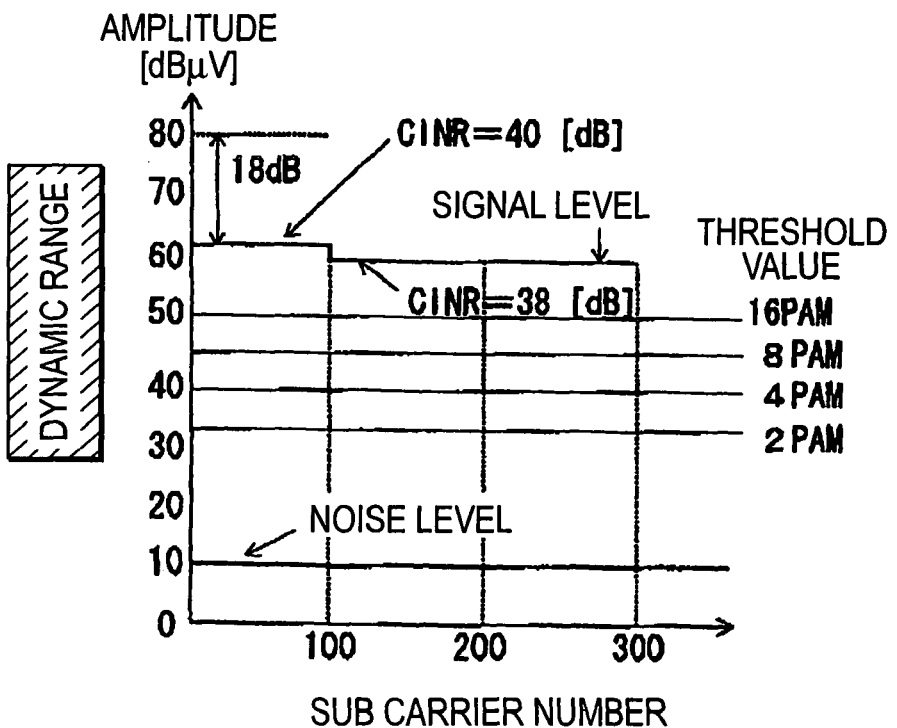

It is assumed that transmission channel estimation is carried out at a plurality of times, and at that time, a reception signal level is also measured (noise level measurement is unnecessary). It is assumed that a reception level at the time of first transmission channel estimation is (a) of FIG. 18. Out of all sub carriers, a MAX level is extracted, and an offset level is set up, and a gain of a sub carrier, which is received with a level of (MAX level-offset level) or more, is lowered by only B in a single uniform way. Next, second time transmission channel estimation is carried out, and a transmission speed is compared with that of the first time, and if a transmission speed has been deteriorated, the last result of CINR and gain information are used as a transmission channel estimation result. In case that a transmission speed has been improved, third time is carried out in the same manner. In this way, the same work is repeated until such time that a transmission speed is deteriorated, and in case that the transmission speed was deteriorated, the last CINR result and gain information are used as a final result. An example is shown in FIG. 18. FIG. 18 is a pattern diagram of a transmission channel estimation characteristic in such a case that a dynamic range is insufficient.

By the first transmission channel estimation, (a) of FIG. 18 is obtained, and here, gains of sub carriers up to sub carrier number 1.about.100 are lowered by 18 dB. Next, second time transmission channel estimation is carried out, and from a result of CINR, it is confirmed that a transmission speed has been improved. Further, third time is carried out, depending upon setup of an offset value, gains of all sub carriers are further lowered by 18 dB, and it is decided whether a transmission speed has been improved or not, and in case that it was deteriorated, transmission channel estimation is finished, and the last CINR value and gain information are used as a final result.

In the example of FIG. 18, depending on a value of offset, there exists such a case that a second time's speed and a third time's speed become the same by accident, but since an actual transmission channel characteristic is complex, we think that there is generally no such a case that they become the same. This, this processing is continued until such time that a transmission speed is deteriorated, and at such a time point that the speed was deteriorated, the last result is to be used as a transmission channel estimation result at that time. Depending on SNR of a transmission channel, a characteristic of a sub carrier whose gain was lowered may be deteriorated, but in case of such a transmission channel that a dynamic range of a receiving device is insufficient as in FIG. 18, thanks to such a fact that a gain of a certain sub carrier was lowered, insufficiency of a dynamic range of entirety is alleviated, and as a result, a transmission speed may be improved. In a transmission channel which shows a characteristic as in (a) of FIG. 18, this system is very useful.

In short, in such a case as in FIG. 18, by significantly lowering a gain of a sub carrier in which a reception level is large, a transmission speed of an entire system is improved. In a power line transmission channel, since an attenuation characteristic and a noise characteristic are complex, we thing that the suchlike method is useful. In passing, since it is troublesome to carry out transmission channel estimation at a plurality of times, transmission channel estimation is limited to 2 times, and as a simplified manner, a sub carrier in which a reception level is (MAX level-offset level) or more, is made non-use daringly, and second time transmission channel estimation is carried out and it may be confirmed whether a speed has been improved. Or, by drastically lowering a gain, but not non-use, CINR may be determined by second time processing. By realizing the suchlike configuration, it is possible to improve transmission speed deterioration due to insufficiency of a dynamic range of a receiving device, and even in a complex transmission channel, it is possible to improve a transmission speed.

Embodiment 22

As a block configuration of a communication apparatus in an embodiment 22 of this invention, used is the block configuration of the communication apparatus of the conventional system of FIG. 19 or the embodiment 1 or 2.

A frame configuration example of the communication apparatus in this embodiment is shown in FIG. 26. FIG. 26 is a view which shows the frame configuration example of the communication apparatus in the embodiment 22 of this invention.

In FIG. 26, this frame configuration shows data which is transmitted toward a receiving device, on the basis of information which the transmitting device 299 obtained from the channel estimation unit 370 of a receiving device.

In the figure, PRE shows a preamble signal which is used in synchronization processing, equalization processing etc. of a receiving device, and SYNC shows a SYNC signal which identifies a data start, and TMI shows a signal which shows information based upon a transmission channel estimation result, and FC shows a frame control signal, and PL shows an information signal.

The information which is based upon a transmission channel estimation result of TMI may be a result itself which was estimated by the channel estimation unit 370 of a receiving device, or information which defines modulation and demodulation, which are use in transmission and reception, on the basis of estimation.

In a normal frame configuration, as shown in the following, a control signal (PRE and SYNC) is located at the forefront, and thereafter, the information signal follows. In this embodiment, transmission channel estimation information is placed at a forefront portion of the information signal. In the example of FIG. 26, it is placed before SYNC, and before FC1. By realizing the suchlike configuration, since it becomes possible to process the TMI signal in the beginning, it is possible to quickly carry out processing of the information signal by use of information of TMI.

Embodiment 23

As a block configuration of a communication apparatus in an embodiment 23 of this invention, considered is the same block configuration as that of the communication apparatus which was disclosed in the embodiment 22.

Here, diversity (frequency diversity, time diversity etc.) processing is carried out to transmission channel estimation result information, and the information is used as the TMI signal. However, since an information amount of a normal transmission channel estimation result is increased, if it is detailed, by that much, when diversity processing with high gain is applied to a large amount of information, transmission efficiency is lowered (there is such a possibility that the TMI signal becomes several dozen symbols). A high resistance property is required for the TMI signal. On that account, the high gain diversity processing is desired to be carried out to the TMI signal, only at such time that transmission channel estimation was carried out, detailed transmission channel estimation result information is exchanged in a communication apparatus as the information signal, and that information is stored in a memory etc., and in a normal communication state, transmitted is only information (INDEX etc.) from which a location, in which that information is stored, is known.

Since an amount of information which is necessary at this time is lessened (normally, several bits), it becomes possible to improve a diversity gain to a large extend, without lowering transmission efficiency. In passing, as a method of obtaining a high gain to the TMI signal, there is error correction, other than diversity, but high gain error correction is generally of large system delay. When processing of the TMI signal is delayed due to system delay, it has an impact on performance of an entire system, and therefore, application is difficult.

In this embodiment, there is only the high gain diversity processing to the TMI signal, and since high gain error correction is not used, system delay is small. By realizing the suchlike configuration, it is possible to generate the TMI signal in which system delay is small, and which has a high resistance property.

In passing, a series of systems were described as to such a case that they were applied to power line communication, and in addition, multi-carrier communication was described as to such a case that wavelet based OFDM was used. However, this system is applicable not only to the wavelet based OFDM, but also to multi-carrier communication which realizes another low side lobe spectrum, by use of OFDM/OQAM (in this case, a multi-value level of a primary modulation system is MQAM: M is a multi-value number), Filtered OFDM, Filtered Multitone systems etc.

In addition, also as a transmission channel, it is not limited to a transmission channel of a power line, and it is possible to apply to a digital communication apparatus etc. which utilizes a power line as a transmission channel.

A communication apparatus, which relates to this invention, becomes possible to follow sufficiently to various fluctuations of a transmission channel such as a power line, and as a power line communication apparatus, or by applying to a high speed communication apparatus of another transmission channel, it is useful.

This application is based upon and claims the benefit of priority of Japanese Patent Application No. 2003-288747 filed on Jul. 30, 2004, the contents of which are incorporated herein by reference in its entirety.

What is claimed is:

1. A receiver that receives a plurality of sub-carriers via a powerline, the powerline supplying an alternative voltage with an AC cycle, said receiver comprising:
   a detector that (i) senses a signal, having a first bandwidth, transmitted from a communication device, the communication device not communicating with said receiver, and (ii) determines if power of the signal exceeds a predetermined value; and
   a channel estimator that (i) lowers power of at least one of the plurality of sub-carriers having a second bandwidth, the second bandwidth overlapping with the first bandwidth of the signal having power exceeding the predetermined value, and (ii) performs a plurality of channel estimations for a period cycle which is nearly equal to the AC cycle.

2. The receiver according to claim 1, wherein the channel estimator performs the plurality of channel estimations utilizing a frequency band of 2-30 MHz.

3. The receiver according to claim 1, wherein the signal includes narrow band noise.

4. The receiver according to claim 3, wherein the communication device performs amateur radio communications and the narrow band noise is generated by the communication device.

5. The receiver according to claim 3, wherein the communication device performs short wave broadcasting and the narrow band noise is generated by the communication device.

6. The receiver according to claim 1, further comprising:
a wavelet transform that performs a wavelet transform and provides an output corresponding to the signal; and
a measuring unit that measures the power of the signal utilizing the output of the wavelet transform,
wherein the detector determines if the power of the signal measured by the measuring unit exceeds the predetermined value.

7. The receiver according to claim 6, further comprising a gain controller that adjusts a gain for a reception signal transmitted from another communication device, the another communication device communicating with said communication apparatus,
wherein said measuring unit measures the adjusted gain as the power of the signal.

8. The receiver according to claim 1, wherein the predetermined value is a statistically calculated value.

9. The receiver according to claim 8, wherein the statistically calculated value is an average value, 10. The receiver according to claim 8, wherein the statistically calculated value is a median value.

11. The receiver according to claim 1, wherein the channel estimator inhibits use of the sub-carrier having the second bandwidth.

12. The receiver according to claim 1, wherein the channel estimator performs the plurality of channel estimations with a timing which is not synchronized with the AC cycle.

13. The receiver according to claim 1, wherein the channel estimator performs the plurality of channel estimations with a timing which is not synchronized with a half cycle of the AC cycle.

14. The receiver according to claim 1, wherein the channel estimator performs the plurality of channel estimations utilizing a channel estimation frame transmitted from another communication device, the another communication device being in communication with said communication apparatus.

15. The receiver according to claim 1, further comprising a gain controller that adjusts a gain for a reception signal transmitted from another communication device, the another communication device being in communication with said communication apparatus,
wherein if the gain controller increases the gain for the reception signal, the channel estimator further lowers power of the sub-carrier which has a third bandwidth adjacent to the second bandwidth.

16. A receiving method for receiving a plurality of sub-carriers via a powerline, the powerline supplying an alternative voltage with an AC cycle, said receiving method comprising:
sensing a signal transmitted from a communication device, the communication device not communicating with said receiver;
determining if power of the signal exceeds a predetermined value, the signal having a first bandwidth;
lowering power of at least one of the plurality of sub-carriers having a second bandwidth, the second bandwidth overlapping with the first bandwidth of the signal having power exceeding the predetermined value; and
performing a plurality of channel estimations for a period cycle which is nearly equal to the AC cycle.

\* \* \* \* \*